US012643343B2

(12) United States Patent
Dubois et al.

(10) Patent No.: US 12,643,343 B2
(45) Date of Patent: Jun. 2, 2026

(54) HUB SYSTEM, METHOD AND DEVICE WITH ADJUSTABLE DEADBAND

(71) Applicant: The Hive Global, Inc., Taichung (TW)

(72) Inventors: George Dubois, San Luis Obispo, CA (US); Joel Peters, Taichung (TW)

(73) Assignee: The Hive Global Inc., Taichung (TW)

( * ) Notice: Subject to any disclaimer, the term of this patent is extended or adjusted under 35 U.S.C. 154(b) by 62 days.

(21) Appl. No.: 18/507,362

(22) Filed: Nov. 13, 2023

(65) Prior Publication Data

US 2024/0157728 A1 May 16, 2024

Related U.S. Application Data

(60) Provisional application No. 63/425,251, filed on Nov. 14, 2022.

(51) Int. Cl.
*B60B 27/04* (2006.01)
*B60B 27/02* (2006.01)
*F16D 41/30* (2006.01)

(52) U.S. Cl.
CPC .......... *B60B 27/047* (2013.01); *B60B 27/023* (2013.01); *F16D 41/30* (2013.01)

(58) Field of Classification Search
CPC ....... F16D 41/30; F16D 41/12; B60B 27/023; B60B 27/047
USPC .......................................................... 74/576
See application file for complete search history.

(56) References Cited

U.S. PATENT DOCUMENTS

| | | | |
|---|---|---|---|
| 512,729 | A | 1/1894 | Lucas et al. |
| 527,384 | A | 10/1894 | Davids |
| 527,520 | A | 10/1894 | Copeland |
| 547,639 | A | 10/1895 | Grubb |
| 575,712 | A | 1/1897 | Hamilton |
| 576,548 | A | 2/1897 | Cassidy |
| 579,479 | A | 3/1897 | Gobbler |
| 590,685 | A | 9/1897 | Matthews |
| 595,388 | A | 12/1897 | Hanson |
| 598,325 | A | 2/1898 | McIntyre |
| 614,900 | A | 11/1898 | Seaver |
| 616,167 | A | 12/1898 | Walker |
| 620,266 | A | 2/1899 | Wodiska |

(Continued)

FOREIGN PATENT DOCUMENTS

| | | |
|---|---|---|
| CN | 102556274 A | 7/2012 |
| CN | 102963485 A | 3/2013 |

(Continued)

OTHER PUBLICATIONS

The Official Letter from European Application No. 16 842 566.8-1009, dated Jan. 17, 2024.

(Continued)

*Primary Examiner* — Richard M Lorence

(74) *Attorney, Agent, or Firm* — Haverstock & Owens, A Law Corporation

(57) ABSTRACT

A freewheel hub having a non-zero deadband distance in order to reduce or eliminate pedal kickback. The deadband distance is able to have or be adjusted to a desired length including lengths that enable silent freewheeling operation where the pawls of the freewheel body do not engage or contact the teeth of the ratchet gear thereby eliminating any contact-based freewheeling sound.

39 Claims, 12 Drawing Sheets

(56) References Cited

U.S. PATENT DOCUMENTS

| | | | |
|---|---|---|---|
| 658,400 | A | 9/1900 | Roberts |
| 666,679 | A | 1/1901 | Kraus |
| 811,799 | A | 2/1906 | Seidemann |
| 848,870 | A | 4/1907 | Weller |
| 1,070,971 | A | 8/1913 | Lowd |
| 1,325,206 | A | 12/1919 | Raybon |
| 1,400,131 | A | 12/1921 | Adams |
| 1,535,601 | A | 4/1925 | Graham |
| 1,636,327 | A | 7/1927 | Roe |
| 2,015,430 | A | 9/1935 | Matthew |
| 2,024,499 | A | 12/1935 | Baron |
| 2,139,176 | A | 12/1938 | Sims |
| 2,228,770 | A | 1/1941 | Le Tourneau |
| 2,317,070 | A | 4/1943 | Le Tourneau |
| 2,567,785 | A | 9/1951 | Rieger |
| 2,568,443 | A | 9/1951 | Gerner |
| 2,751,797 | A | 6/1956 | Pearl |
| 3,184,993 | A | 5/1965 | Swenson |
| 3,185,439 | A | 5/1965 | Inaba et al. |
| 3,303,720 | A | 2/1967 | Jaulmes |
| 3,332,297 | A | 7/1967 | Morse |
| D208,683 | S | 9/1967 | Schreckengost |
| 3,382,734 | A | 5/1968 | Hussey |
| 3,416,385 | A | 12/1968 | Schenk |
| 3,477,303 | A | 11/1969 | Brilando |
| 3,485,113 | A | 12/1969 | Adcock |
| 3,592,076 | A | 7/1971 | Baginski |
| 3,748,916 | A | 7/1973 | Morse |
| 3,760,653 | A | 9/1973 | Hagenah |
| 3,785,129 | A | 1/1974 | Szmutko |
| 3,807,255 | A | 4/1974 | Baginski |
| 3,811,339 | A | 5/1974 | Konzorr |
| 3,869,138 | A | 3/1975 | Allison |
| 3,910,136 | A | 10/1975 | Juy |
| 3,933,373 | A | 1/1976 | Gammelgaard |
| 3,964,343 | A | 6/1976 | Lauterbach |
| 3,973,447 | A | 8/1976 | Nagano |
| 4,016,357 | A | 4/1977 | Abrahamsen |
| 4,037,484 | A | 7/1977 | Morse |
| 4,044,621 | A | 8/1977 | McGregor, Sr. |
| 4,078,444 | A | 3/1978 | Huret |
| 4,089,236 | A | 5/1978 | Genzling |
| 4,093,325 | A | 6/1978 | Troccaz |
| 4,135,727 | A | 1/1979 | Camagnolo |
| 4,237,743 | A | 12/1980 | Nagano |
| 4,240,303 | A | 12/1980 | Mosley |
| 4,269,084 | A | 5/1981 | Okajima |
| 4,298,210 | A | 11/1981 | Lotteau |
| 4,302,987 | A | 12/1981 | Takeda |
| 4,324,323 | A | 4/1982 | Campagnolo |
| 4,330,137 | A | 5/1982 | Nagano |
| 4,337,933 | A | 7/1982 | Egami |
| 4,377,952 | A | 3/1983 | Gamondes |
| 4,380,445 | A | 4/1983 | Shimano |
| 4,398,434 | A | 8/1983 | Kimura |
| 4,429,448 | A | 2/1984 | Butz |
| 4,433,963 | A | 2/1984 | Shimano |
| 4,439,172 | A | 3/1984 | Segawa |
| 4,441,383 | A | 4/1984 | Segawa |
| 4,442,732 | A | 4/1984 | Okajima |
| 4,445,289 | A | 5/1984 | Beneteau |
| 4,445,397 | A | 5/1984 | Shimano |
| 4,472,163 | A | 9/1984 | Bottini |
| 4,475,894 | A | 10/1984 | Sugino |
| 4,487,424 | A | 12/1984 | Ellis |
| 4,488,453 | A | 12/1984 | Drugeon |
| 4,498,890 | A | 2/1985 | Sutherland |
| 4,506,463 | A | 3/1985 | Chassing |
| 4,507,105 | A | 3/1985 | Stottmann |
| 4,515,386 | A | 5/1985 | Tsujimura |
| 4,523,492 | A | 6/1985 | Shimano |
| 4,538,480 | A | 9/1985 | Trindle |
| 4,548,422 | A | 10/1985 | Michel et al. |
| 4,573,950 | A | 3/1986 | Nagano |
| 4,608,878 | A | 9/1986 | Shimano |
| 4,632,416 | A | 12/1986 | Zelenetz |
| 4,639,240 | A | 1/1987 | Liu |
| 4,640,151 | A | 2/1987 | Howell |
| 4,646,586 | A | 3/1987 | Raposarda |
| 4,662,862 | A | 5/1987 | Matson |
| 4,665,767 | A | 5/1987 | Lassche |
| 4,686,867 | A | 8/1987 | Bernard |
| 4,704,919 | A | 11/1987 | Durham |
| 4,735,107 | A | 4/1988 | Winkie |
| D298,613 | S | 11/1988 | McMurtey |
| 4,791,692 | A | 12/1988 | Collins |
| 4,803,894 | A | 2/1989 | Howell |
| 4,811,626 | A | 3/1989 | Bezin |
| 4,815,333 | A | 3/1989 | Sampson |
| 4,827,633 | A | 5/1989 | Feldstein |
| 4,832,667 | A | 5/1989 | Wren |
| 4,838,115 | A | 6/1989 | Nagano |
| 4,840,085 | A | 6/1989 | Nagano |
| 4,854,924 | A | 8/1989 | Nagano |
| 4,856,801 | A | 8/1989 | Hollingsworth |
| 4,873,890 | A | 10/1989 | Nagano |
| 4,882,946 | A | 11/1989 | Beyl |
| 4,893,523 | A | 1/1990 | Lennon |
| 4,898,063 | A | 2/1990 | Sampson |
| 4,900,050 | A | 2/1990 | Bishop et al. |
| 4,905,541 | A | 3/1990 | Alan |
| 4,923,324 | A | 5/1990 | Favrou |
| 4,928,549 | A | 5/1990 | Nagano |
| 4,932,287 | A | 6/1990 | Ramos |
| 4,947,708 | A | 8/1990 | Lacomb |
| 4,986,949 | A | 1/1991 | Trimble |
| 5,002,520 | A | 3/1991 | Greenlaw |
| 5,003,841 | A | 4/1991 | Nagano |
| 5,014,571 | A | 5/1991 | Dapezi |
| 5,018,564 | A | 5/1991 | Anglin |
| 5,019,312 | A | 5/1991 | Bishop |
| 5,046,382 | A | 9/1991 | Steinberg |
| 5,048,369 | A | 9/1991 | Chen |
| 5,060,537 | A | 10/1991 | Nagano |
| 5,067,930 | A | 11/1991 | Morales |
| D323,309 | S | 1/1992 | Perry |
| 5,115,692 | A | 5/1992 | Nagano |
| 5,121,935 | A | 6/1992 | Mathieu et al. |
| 5,125,288 | A | 6/1992 | Amiet |
| 5,125,489 | A | 6/1992 | Cha |
| 5,179,873 | A | 1/1993 | Girvin |
| 5,188,384 | A | 2/1993 | van Raemdonck |
| 5,194,051 | A | 3/1993 | Nagano |
| 5,195,397 | A | 3/1993 | Nagano |
| 5,203,229 | A | 4/1993 | Chen |
| 5,207,768 | A | 5/1993 | Gluys |
| 5,209,581 | A | 5/1993 | Nagano |
| 5,215,322 | A | 6/1993 | Enders |
| 5,259,270 | A | 11/1993 | Lin |
| 5,301,974 | A | 4/1994 | Knapp |
| 5,320,582 | A | 6/1994 | Takeda |
| 5,324,100 | A | 6/1994 | James |
| 5,326,331 | A | 7/1994 | Hallock, III |
| 5,379,665 | A | 1/1995 | Nagano |
| D355,872 | S | 2/1995 | Haney |
| 5,419,218 | A | 5/1995 | Romano |
| 5,423,233 | A | 6/1995 | Peyre |
| 5,435,869 | A | 7/1995 | Christensen |
| 5,451,071 | A | 9/1995 | Pong et al. |
| 5,460,576 | A | 10/1995 | Barnett |
| 5,496,222 | A | 3/1996 | Kojima |
| 5,497,680 | A | 3/1996 | Nagano |
| 5,503,600 | A | 4/1996 | Berecz |
| 5,505,111 | A | 4/1996 | Nagano |
| 5,522,282 | A | 6/1996 | Nagano |
| 5,522,611 | A | 6/1996 | Schmidt |
| 5,540,118 | A | 7/1996 | Calendrille, Jr. |
| 5,544,907 | A | 8/1996 | Lin et al. |
| 5,549,396 | A | 8/1996 | Chiang |
| 5,620,384 | A | 4/1997 | Kojima |
| 5,626,060 | A | 5/1997 | Lin |
| 5,632,940 | A | 5/1997 | Whatley |
| 5,644,953 | A | 7/1997 | Leng |
| 5,676,616 | A | 10/1997 | Hara |

(56)                 References Cited

U.S. PATENT DOCUMENTS

| | | | |
|---|---|---|---|
| 5,679,084 A | 10/1997 | Daniels, III | |
| 5,687,619 A | 11/1997 | Bryne | |
| 5,725,450 A | 3/1998 | Huskey | |
| 5,727,429 A | 3/1998 | Ueda | |
| 5,728,018 A | 3/1998 | Terada | |
| 5,765,450 A | 6/1998 | Kruger | |
| 5,771,757 A | 6/1998 | Hanamura | |
| 5,782,714 A | 7/1998 | Osgood | |
| 5,788,593 A | 8/1998 | Tiong | |
| 5,791,202 A | 8/1998 | Karsdon | |
| 5,803,476 A | 9/1998 | Olson et al. | |
| 5,806,379 A | 9/1998 | Nagano | |
| 5,809,844 A | 9/1998 | Durham | |
| 5,816,377 A | 10/1998 | Nakamura | |
| 5,819,599 A | 10/1998 | Yamanaka | |
| 5,846,148 A | 12/1998 | Fuji | |
| 5,893,299 A | 4/1999 | Yamanaka | |
| 5,927,155 A | 7/1999 | Jackson | |
| 5,935,034 A | 8/1999 | Campagnolo | |
| 5,941,135 A | 8/1999 | Schlanger | |
| 5,943,795 A | 8/1999 | Ueda | |
| 5,954,604 A | 9/1999 | Nakamura | |
| 6,003,889 A | 12/1999 | Shalom | |
| 6,014,913 A | 1/2000 | Masahiro | |
| 6,014,914 A | 1/2000 | Ueda | |
| 6,039,665 A | 3/2000 | Nakamura | |
| 6,058,803 A | 5/2000 | Yamanaka | |
| 6,059,171 A | 5/2000 | Yamanaka et al. | |
| 6,059,378 A | 5/2000 | Dougherty | |
| 6,060,982 A | 5/2000 | Holtrop | |
| 6,083,132 A | 7/2000 | Walker | |
| 6,095,691 A | 8/2000 | Chiang | |
| 6,102,821 A | 8/2000 | Nakamura | |
| 6,117,032 A | 9/2000 | Nankou | |
| 6,165,092 A | 12/2000 | Bramham | |
| 6,202,506 B1 | 3/2001 | Storck et al. | |
| 6,203,459 B1 | 3/2001 | Calendrille, Jr. | |
| 6,220,581 B1 | 4/2001 | Mueller | |
| 6,264,575 B1 | 7/2001 | Lim et al. | |
| 6,266,990 B1 | 7/2001 | Shook et al. | |
| 6,305,243 B1 | 10/2001 | Chiang | |
| 6,314,834 B1 | 11/2001 | Smith et al. | |
| 6,332,853 B1 | 12/2001 | Bowman | |
| 6,354,973 B1 | 3/2002 | Barnett | |
| 6,382,381 B1 | 5/2002 | Okajima et al. | |
| 6,416,434 B1 | 7/2002 | Calendrille, Jr. | |
| 6,428,437 B1 | 8/2002 | Schlanger | |
| 6,488,603 B2 | 12/2002 | Lim et al. | |
| 6,490,948 B2 | 12/2002 | Tanaka | |
| 6,520,048 B2 | 2/2003 | Chen | |
| 6,533,690 B2 | 3/2003 | Barnett | |
| 6,564,675 B1 | 5/2003 | Jiang | |
| 6,612,201 B1 | 9/2003 | Chen | |
| 6,637,292 B2 | 10/2003 | Chu | |
| 6,647,826 B2 | 11/2003 | Okajima | |
| 6,725,742 B2 | 4/2004 | Bremer | |
| 6,729,204 B1 | 5/2004 | Chen | |
| 6,805,373 B2 | 10/2004 | Singenberger et al. | |
| 6,848,700 B1 | 2/2005 | Fritschen | |
| 6,988,427 B2 | 1/2006 | Yamanaka | |
| 7,011,592 B2 | 3/2006 | Shahana et al. | |
| 7,013,754 B2 | 3/2006 | Milanowski | |
| 7,024,961 B2 | 4/2006 | Hsiao | |
| D522,414 S | 6/2006 | Chen | |
| 7,059,983 B2 | 6/2006 | Heim | |
| 7,066,856 B1 | 6/2006 | Rogers | |
| 7,066,857 B1 | 6/2006 | DeRosa | |
| D524,195 S | 7/2006 | Neal | |
| 7,108,428 B2 | 9/2006 | Ason | |
| 7,118,505 B2 | 10/2006 | Lee | |
| 7,131,656 B2 | 11/2006 | Valle | |
| 7,174,807 B2 | 2/2007 | Bryne | |
| 7,240,587 B2 | 7/2007 | Plassiard | |
| 7,263,914 B2 | 9/2007 | Ording et al. | |
| 7,334,500 B2 | 2/2008 | Tseng | |
| 7,523,685 B2 | 4/2009 | French | |
| 7,562,604 B2 | 7/2009 | Fukui | |
| 7,610,832 B2 | 11/2009 | Dal Pra' | |
| 7,650,817 B2 | 1/2010 | Shiraishi et al. | |
| 7,753,157 B1 | 7/2010 | Woods | |
| 7,770,492 B2 | 8/2010 | French | |
| 7,775,128 B2 | 8/2010 | Roessingh et al. | |
| 7,886,947 B2 | 2/2011 | Campagnolo | |
| 7,931,553 B2 | 4/2011 | Tokuyama | |
| 7,938,242 B2* | 5/2011 | Chen | F16D 41/30 |
| | | | 74/576 |
| 7,959,529 B2 | 6/2011 | Braedt | |
| 8,024,993 B2 | 9/2011 | Dal Pra' et al. | |
| 8,025,304 B2 | 9/2011 | Smith | |
| 8,066,293 B2 | 11/2011 | Meggiolan | |
| 8,127,909 B2* | 3/2012 | Chen | B60B 27/023 |
| | | | 74/576 |
| 8,197,371 B2 | 6/2012 | D'Aluisio | |
| 8,235,849 B2 | 8/2012 | Carnston et al. | |
| 8,267,417 B1 | 9/2012 | Yamamaka | |
| 8,276,731 B2* | 10/2012 | Chen | F16D 41/30 |
| | | | 74/576 |
| 8,302,504 B2 | 11/2012 | Dal Pra' | |
| 8,393,794 B1 | 3/2013 | Shiraishi | |
| 8,413,769 B2 | 4/2013 | Thrash | |
| 8,491,429 B2 | 7/2013 | Cranston et al. | |
| 8,561,500 B2 | 10/2013 | D'Aluisio | |
| 8,578,816 B2 | 11/2013 | Lin | |
| 8,590,421 B2 | 11/2013 | Meggiolan et al. | |
| 8,616,084 B2 | 12/2013 | Meggiolan | |
| 8,641,151 B2 | 2/2014 | Kamada | |
| 8,663,044 B2 | 3/2014 | Lin | |
| 8,689,662 B2 | 4/2014 | Pasqua et al. | |
| 8,707,823 B2 | 4/2014 | Dal Pra' | |
| 8,770,061 B2 | 7/2014 | Meggiolan et al. | |
| 8,820,192 B2 | 9/2014 | Staples et al. | |
| 8,834,309 B2 | 9/2014 | Braedt | |
| 8,863,616 B2 | 10/2014 | Ciavatta et al. | |
| 8,888,629 B2 | 11/2014 | Ji | |
| 8,911,314 B2 | 12/2014 | Braedt | |
| 8,979,685 B2 | 3/2015 | Weagle | |
| 9,003,921 B2 | 4/2015 | Weagle | |
| 9,011,282 B2 | 4/2015 | Staples | |
| 9,260,158 B2 | 2/2016 | Braedt | |
| 9,458,871 B2 | 10/2016 | Ishizaki | |
| 9,517,811 B1 | 12/2016 | Shiraishi | |
| 10,160,030 B2 | 12/2018 | Earle et al. | |
| 10,221,887 B2 | 3/2019 | Dubois et al. | |
| 10,259,526 B2 | 4/2019 | Hsieh | |
| 10,260,568 B2 | 4/2019 | Chen | |
| 10,480,571 B2 | 11/2019 | Dubois et al. | |
| 10,562,588 B2 | 2/2020 | Thrash et al. | |
| 11,142,280 B2 | 10/2021 | Dubois et al. | |
| 11,780,520 B1 | 10/2023 | Staples | |
| 2001/0049976 A1 | 12/2001 | Dodman | |
| 2002/0014384 A1 | 2/2002 | Kroger | |
| 2002/0028719 A1 | 3/2002 | Yamanaka | |
| 2002/0139631 A1 | 10/2002 | Wang | |
| 2002/0160869 A1 | 10/2002 | Barnett | |
| 2002/0170382 A1 | 11/2002 | Yang | |
| 2002/0194951 A1 | 12/2002 | Lowe | |
| 2003/0029271 A1 | 2/2003 | Shuman | |
| 2003/0041689 A1 | 3/2003 | Chu | |
| 2003/0051576 A1 | 3/2003 | Muraoka | |
| 2003/0064844 A1 | 4/2003 | Lin | |
| 2003/0171180 A1 | 9/2003 | Shahana et al. | |
| 2003/0183036 A1 | 10/2003 | Chou | |
| 2003/0197346 A1 | 10/2003 | Singenberger et al. | |
| 2004/0009835 A1 | 1/2004 | Heim | |
| 2004/0037628 A1 | 2/2004 | Meggiolan | |
| 2004/0162172 A1 | 8/2004 | Yamanaka | |
| 2004/0182197 A1 | 9/2004 | Chiang | |
| 2004/0187635 A1 | 9/2004 | Bryne | |
| 2004/0200314 A1 | 10/2004 | Hermansen et al. | |
| 2004/0211289 A1 | 10/2004 | Chiang et al. | |
| 2004/0254038 A1 | 12/2004 | Chamberlain | |
| 2005/0005729 A1 | 1/2005 | Chen | |
| 2005/0009034 A1 | 1/2005 | Morgan et al. | |
| 2005/0012298 A1 | 1/2005 | Dal Pra et al. | |

(56)         References Cited

U.S. PATENT DOCUMENTS

| | | |
|---|---|---|
| 2005/0016323 A1 | 1/2005 | Dal Pra' |
| 2005/0022625 A1 | 2/2005 | Nonoshita |
| 2005/0032596 A1 | 2/2005 | Nonoshita et al. |
| 2005/0035571 A1 | 2/2005 | Huck |
| 2005/0081678 A1 | 4/2005 | Smith et al. |
| 2005/0081679 A1 | 4/2005 | Chen |
| 2005/0145061 A1 | 7/2005 | Ording et al. |
| 2005/0178236 A1 | 8/2005 | Crozet et al. |
| 2005/0199092 A1 | 9/2005 | Feltrin et al. |
| 2005/0217417 A1 | 10/2005 | Uchida et al. |
| 2005/0252337 A1 | 11/2005 | Chen |
| 2005/0284253 A1 | 12/2005 | Hervig |
| 2006/0029317 A1 | 2/2006 | Yamamoto |
| 2006/0063624 A1 | 3/2006 | Voss |
| 2006/0066074 A1 | 3/2006 | Turner |
| 2006/0075846 A1 | 4/2006 | Valle |
| 2006/0081088 A1 | 4/2006 | Muraoka |
| 2006/0117905 A1 | 6/2006 | Yamanaka et al. |
| 2006/0169098 A1 | 8/2006 | Valle |
| 2006/0199690 A1 | 9/2006 | Gardner |
| 2006/0236809 A1 | 10/2006 | Bryne |
| 2006/0258499 A1 | 11/2006 | Kamada |
| 2006/0266154 A1 | 11/2006 | Hermansen |
| 2006/0288819 A1 | 12/2006 | Dal Pra' et al. |
| 2007/0034043 A1 | 2/2007 | Mauri |
| 2007/0049436 A1 | 3/2007 | Kamada |
| 2007/0062328 A1 | 3/2007 | Shiraishi |
| 2007/0134456 A1 | 6/2007 | Fritschen |
| 2007/0137426 A1 | 6/2007 | Meggiolan et al. |
| 2007/0137432 A1 | 6/2007 | Chen |
| 2007/0182122 A1 | 8/2007 | Smith |
| 2007/0199403 A1 | 8/2007 | Ciavatta et al. |
| 2007/0204720 A1 | 9/2007 | Poyzer |
| 2007/0204722 A1 | 9/2007 | Dal Pra |
| 2007/0207631 A1 | 9/2007 | Meggiolan et al. |
| 2007/0222172 A1 | 9/2007 | Chen |
| 2007/0235986 A1 | 10/2007 | Weagle |
| 2007/0241530 A1 | 10/2007 | Nonoshita |
| 2007/0254758 A1 | 11/2007 | Chen |
| 2007/0283781 A1 | 12/2007 | Meggiolan |
| 2007/0284782 A1 | 12/2007 | Dal Pra' |
| 2007/0289406 A1 | 12/2007 | French |
| 2007/0289407 A1 | 12/2007 | French |
| 2008/0004143 A1 | 1/2008 | Kanehisa |
| 2008/0005905 A1 | 1/2008 | Valle et al. |
| 2008/0058144 A1 | 3/2008 | Oseto et al. |
| 2008/0152460 A1 | 6/2008 | Watanabe |
| 2008/0224440 A1 | 9/2008 | Masuda et al. |
| 2008/0231014 A1 | 9/2008 | Braedt |
| 2008/0234082 A1 | 9/2008 | Braedt |
| 2008/0272572 A1 | 11/2008 | Tsai |
| 2008/0289927 A1 | 11/2008 | Ji |
| 2008/0307652 A1 | 12/2008 | Chiang |
| 2008/0314193 A1 | 12/2008 | Meggiolan |
| 2009/0042682 A1 | 2/2009 | Dal Pra |
| 2009/0056495 A1 | 3/2009 | Bischoff et al. |
| 2009/0056496 A1 | 3/2009 | Dodman et al. |
| 2009/0078081 A1 | 3/2009 | French |
| 2009/0095122 A1 | 4/2009 | Weagle |
| 2009/0145262 A1 | 6/2009 | Pasqua et al. |
| 2009/0151509 A1 | 6/2009 | French |
| 2009/0191996 A1 | 7/2009 | D'Aluisio |
| 2009/0236777 A1 | 9/2009 | Chiang |
| 2009/0243250 A1 | 10/2009 | Chiang |
| 2009/0261553 A1 | 10/2009 | Meggiolan |
| 2010/0009794 A1 | 1/2010 | Chiang |
| 2010/0058889 A1 | 3/2010 | Dal Pra |
| 2010/0064845 A1 | 3/2010 | French |
| 2010/0099530 A1 | 4/2010 | Chiang et al. |
| 2010/0122886 A1 | 5/2010 | Chen |
| 2010/0229675 A1 | 9/2010 | Dodman et al. |
| 2010/0236356 A1 | 9/2010 | Dodman |
| 2010/0275724 A1 | 11/2010 | Staples et al. |
| 2010/0295265 A1 | 11/2010 | Burdick |
| 2011/0011202 A1 | 1/2011 | Lin |

| | | |
|---|---|---|
| 2011/0105263 A1 | 5/2011 | Braedt |
| 2011/0130233 A1 | 6/2011 | Tokuyama |
| 2011/0140390 A1 | 6/2011 | Kuroiwa et al. |
| 2011/0204201 A1 | 8/2011 | Kodama |
| 2011/0290069 A1 | 12/2011 | Lin |
| 2012/0067675 A1 | 3/2012 | Thrash |
| 2012/0119565 A1 | 5/2012 | Kamada |
| 2012/0225745 A1 | 9/2012 | Oishi |
| 2012/0260767 A1 | 10/2012 | D'Aluisio |
| 2012/0302384 A1 | 11/2012 | Braedt |
| 2013/0053195 A1 | 2/2013 | Emura et al. |
| 2013/0053196 A1 | 2/2013 | Emura et al. |
| 2013/0068066 A1 | 3/2013 | Staples et al. |
| 2013/0114999 A1 | 5/2013 | Ostling |
| 2013/0225343 A1 | 8/2013 | Spahr et al. |
| 2014/0157951 A1 | 6/2014 | Dubois et al. |
| 2014/0179474 A1 | 6/2014 | Florczyk |
| 2014/0345419 A1 | 11/2014 | Staples et al. |
| 2015/0020621 A1 | 1/2015 | Kawakami |
| 2015/0024884 A1 | 1/2015 | Braedt |
| 2015/0210353 A1 | 7/2015 | Tokuyama et al. |
| 2016/0167737 A1 | 6/2016 | Tokuyama |
| 2016/0176447 A1 | 6/2016 | Ko et al. |
| 2016/0195184 A1 | 7/2016 | Lermen et al. |
| 2016/0236749 A1 | 8/2016 | Cody |
| 2016/0272002 A1 | 9/2016 | Earie |
| 2017/0057598 A1 | 3/2017 | Thrash et al. |
| 2017/0101124 A1 | 4/2017 | Assmann |
| 2017/0274960 A1 | 9/2017 | Dubois et al. |
| 2017/0314665 A1 | 11/2017 | Garcia |
| 2018/0022415 A1 | 1/2018 | Oishi |
| 2018/0057087 A1 | 3/2018 | Jhou et al. |
| 2018/0148126 A1 | 5/2018 | Tetsuka |
| 2018/0170479 A1 | 6/2018 | Sugimoto |
| 2018/0257742 A1 | 9/2018 | Chen |
| 2018/0297664 A1 | 10/2018 | Fukumori |
| 2018/0334212 A1 | 11/2018 | Bowers |
| 2018/0346064 A1 | 12/2018 | Fijita |
| 2019/0047649 A1 | 2/2019 | Chiesa |
| 2019/0054765 A1 | 2/2019 | Thrash |
| 2019/0093749 A1 | 3/2019 | Bisarello |
| 2019/0154083 A1 | 5/2019 | Dubois et al. |
| 2019/0233051 A1 | 8/2019 | Carrasco Vergara |
| 2019/0241015 A1 | 8/2019 | Tien |
| 2019/0241233 A1 | 8/2019 | Miranda |
| 2020/0009907 A1 | 1/2020 | Cotter et al. |
| 2020/0140034 A1 | 5/2020 | Thrash et al. |
| 2020/0223255 A1 | 7/2020 | Kamada |
| 2020/0354016 A1 | 11/2020 | Di Serio |
| 2021/0094642 A1 | 4/2021 | Dubois et al. |
| 2021/0171153 A1 | 6/2021 | Nichols |
| 2022/0041248 A1 | 2/2022 | Jordan |
| 2022/0111919 A1 | 4/2022 | Staples |
| 2023/0322318 A1 | 10/2023 | Staples |
| 2024/0043090 A1 | 2/2024 | Caillaud |
| 2024/0157728 A1 | 5/2024 | Dubois et al. |

FOREIGN PATENT DOCUMENTS

| | | |
|---|---|---|
| CN | 108238209 A | 7/2018 |
| CN | 108974239 B | 7/2021 |
| DE | 19751879 A1 | 5/1999 |
| DE | 102006015582 A1 | 10/2007 |
| DE | 202018103890 U1 | 11/2019 |
| EP | 0510371 A1 | 10/1992 |
| EP | 0765802 A2 | 4/1997 |
| EP | 0765802 A3 | 4/1997 |
| EP | 0766017 A1 | 4/1997 |
| EP | 0849153 B1 | 12/1997 |
| EP | 0834450 A1 | 4/1998 |
| EP | 0849154 A2 | 6/1998 |
| EP | 0849155 A2 | 6/1998 |
| EP | 0765802 B1 | 7/1999 |
| EP | 1043221 A2 | 10/2000 |
| EP | 1120336 A2 | 8/2001 |
| EP | 1270393 B1 | 1/2003 |
| EP | 1281609 B1 | 2/2003 |
| EP | 1378430 A1 | 1/2004 |
| EP | 1378433 A1 | 1/2004 |

(56) References Cited

FOREIGN PATENT DOCUMENTS

| | | |
|---|---|---|
| EP | 1407962 A1 | 4/2004 |
| EP | 1419961 A1 | 5/2004 |
| EP | 1422134 A2 | 5/2004 |
| EP | 1439117 A2 | 7/2004 |
| EP | 1439118 A2 | 7/2004 |
| EP | 1616781 A1 | 1/2006 |
| EP | 1688345 A2 | 8/2006 |
| EP | 1792821 A1 | 6/2007 |
| EP | 1818251 A1 | 8/2007 |
| EP | 1964769 A2 | 9/2008 |
| EP | 1964769 A3 | 9/2008 |
| EP | 1 995 166 A2 | 11/2008 |
| EP | 2006199 A2 | 12/2008 |
| EP | 2022713 A2 | 2/2009 |
| EP | 2042422 A2 | 4/2009 |
| EP | 2045181 A1 | 4/2009 |
| EP | 2048075 A2 | 4/2009 |
| EP | 1486413 B1 | 4/2010 |
| EP | 2441656 A1 | 4/2011 |
| EP | 1818252 B1 | 9/2011 |
| EP | 1820726 B1 | 9/2011 |
| EP | 2311718 B1 | 10/2011 |
| EP | 2412620 A1 | 2/2012 |
| EP | 1669285 B1 | 4/2012 |
| EP | 1486412 B1 | 5/2014 |
| EP | 1342657 B2 | 10/2014 |
| EP | 3 109 062 A1 | 12/2016 |
| EP | 3507183 B1 | 10/2020 |
| GB | 1031337 | 6/1966 |
| GB | 1281731 | 7/1972 |
| GB | 1361394 | 7/1974 |
| GB | 1431308 | 4/1976 |
| GB | 2177628 A | 1/1987 |
| GB | 2225296 A | 5/1990 |
| GB | 2289507 A | 11/1995 |
| JP | 10181669 A | 7/1998 |
| JP | 2008189254 A | 8/2008 |
| JP | 2009293677 A | 12/2009 |
| JP | 2019142351 A | 8/2019 |
| JP | 2020199878 A | 12/2020 |
| NL | 2005745 | 5/2012 |
| TW | I291428 B | 12/2007 |
| TW | M458370 U1 | 8/2013 |
| TW | I411554 B | 10/2013 |
| TW | I411555 B | 10/2013 |
| TW | M476087 U | 4/2014 |
| TW | 201507920 | 3/2015 |
| TW | 201708016 A | 3/2017 |
| TW | 201806822 A | 3/2018 |
| TW | 202000489 A | 1/2020 |
| TW | I708709 B | 11/2020 |
| WO | 89/08039 | 8/1989 |
| WO | 96/03306 | 2/1996 |
| WO | 99/54193 | 10/1999 |
| WO | 01/72578 A1 | 10/2001 |
| WO | 02/32751 A2 | 4/2002 |
| WO | 03/000543 A1 | 1/2003 |
| WO | 2004/080786 A2 | 9/2004 |
| WO | 2004/094218 A2 | 11/2004 |
| WO | 2012/065256 A1 | 5/2012 |
| WO | 2012/069389 A1 | 5/2012 |
| WO | 2017040047 A1 | 3/2017 |
| WO | 2017165226 A1 | 9/2017 |
| WO | 2019040340 A1 | 2/2019 |
| WO | 2022015790 A1 | 1/2022 |

OTHER PUBLICATIONS

The Notification of Transmittal of the International Search Report and the Written Opinion of the International Search Authority from International Application No. PCT/US23/79485, dated Mar. 1, 2024.

The Notice of Intention to Grant from European Application No. 17 770 865.8-1012, dated Mar. 19, 2024.

Translation of DE-202018103890-U1, Nov. 14, 2019 (Year: 2019).

Define middle, Microsoft Bing, Nov. 11, 2023 (Year: 2023).

The Taiwanese Office Action and Search Report dated Oct. 28, 2024 for TW Patent Application No. 110126001.

The Notification Concerning Transmittal of International Preliminary Report on Patentability (Chapter 1 of the Patent Cooperation Treaty) dated May 22, 2025 for PCT Patent Application: PCT/US2023/079485.

The Office Action from the Taiwan Application No. 109133450 dated Jan. 5, 2022.

EP Official Letter dated Mar. 4, 2022, in European Application No. 16 842 566.8-1009.

Office Action dated Mar. 14, 2022, in Chinese Application No. 201880064395.8.

International Search Report, mailed Jun. 9, 2022, for International Application No. PCT/US22/21360.

The Examination Notification dated Jun. 28, 2022, for Taiwanese Application No. 107129023.

Invention Patent Decision dated Oct. 24, 2022, of the Intellectual Property office of the Ministry of Economic Affairs in Taiwan Application No. 109133450.

The Official Letter dated Oct. 6, 2022, for European Application No. 17770865.8.

The Machine Translation of JP 2019142351.

The International Preliminary Report on Patentability for PCT Application No. PCT/US2021/041529.

The Official Letter dated Apr. 5, 2023 from the European Patent Application No. EP18848212.9.

The Request for Patent Invalidation dated Jun. 26, 2023, from the Taiwanese Patent Application No. 109133450.

Machine translation of DE 10 2006 015 582.

The International Preliminary Report dated Oct. 5, 2023, from the International Patent Application No. PCT/US2022/021360.

The Notice of Allowance dated Sep. 14, 2023, from the Taiwanese Patent Application No. 107129023.

The Official Letter dated Jul. 28, 2021 from the Chinese Patent Application No. 201780017990.1.

The Second Office Action dated Oct. 22, 2021 from the Chinese Patent Application No. 201880064395.8.

The International Search Report with Written Opinion dated Nov. 10, 2021, from the PCT Patent Application No. PCT/US2021/041529.

The Notice of Allowance dated Nov. 15, 2021 from the Chinese Patent Application No. 201780017990.1.

The Office Action from the Taiwan Application No. 106109159 dated Nov. 26, 2021.

The Official Letter in the EP Application No. 16 842 566.8-1009, dated Mar. 27, 2025.

International Search Report from PCT/US2017/023016.

The Taiwanese Office Action dated Jun. 29, 2020 for the Taiwanese Patent Application No. 105126399.

The Taiwanese Examination Notification dated Jul. 31, 2020 for the Taiwanese Patent Application No. 106109159.

The European Search Report dated Apr. 1, 2019 for the European Patent Application No. 106842566.8.

The International Search Report and Written Opinion dated Nov. 9, 2018 for the International Application No. PCT/US2018/46952.

The European Search Report dated Jun. 13, 2019 for the European Patent Application No. 17 77 0865.

Machine translation of DE 19751879 obtained on Dec. 6, 2018.

The Chinese Office Action dated Apr. 29, 2020 for the Chinese Patent Application No. 2016800500067.

The Taiwanese Office Action dated Jan. 9, 2020 for the Taiwanese Patent Application No. 105126339.

The Chinese Office Action dated Feb. 3, 2020 for the Chinese Patent Application No. 201780017990.01.

The International Preliminary Report on Patentability for the PCT Application : PCT/US2017/023016.

The International Preliminary Report for the PCT Application : PCT/US2018/046952 dated Mar. 5, 2020.

The European Office Action dated Mar. 5, 2020 for the European Patent Application No. 16 842 566.8.

(56)         References Cited

OTHER PUBLICATIONS

The Taiwanese Office Action dated Jun. 29, 2020 for the Taiwan Patent Application No. 105126399.
The Taiwanese Examination Notification dated Jul. 31, 2020 for the Taiwan Patent Application No. 106109159.
The Second Office Action dated Sep. 14, 2020 for the Taiwan Patent Application No. 201780017990.1.
The Official Letter dated Dec. 1, 2020 from the European Patent Application No. 16842533.8.
The Notice to Grant dated Feb. 19, 2021 from the Chinese Patent Application No. 201680050006.7.
The Chinese Notice of Examination dated Mar. 1, 2021 from the Chinese Patent Application No. 201880064395.8.
The European Search Report dated Mar. 16, 2021 for the European Patent Application No. EP 18 84 8212.
The Chinese Office Action dated Mar. 30, 2021 for the Chinese Application No. 201780017990.01.
The Official Letter dated Aug. 19, 2025 received from the European Patent Office for European Patent Application No. 16842566.8.
The Office Action dated Sep. 2, 2025 from Taiwanese Patent Application No. 111111103.
The Office Action dated Aug. 29, 2025 from Taiwanese Patent Application No. 11420917010.
The International Search Report and Written Opinion dated Sep. 2, 2025 from International Application No. PCT/US2025/036030.
The First Office Action dated Jun. 6, 2025 from the Chinese Patent Application No. 202180054868.8.
The Board Opinion dated May 30, 2025, from Chinese Patent Application No. 201880064395.8.

* cited by examiner

200

204

216  210

206

202

214

215

212  209  208

202

AC

WP

206

AR

L2

L1

100

102

104

106a

108

140

106c

106b

106

164

160

162

106

170

168

160

166

HUB SYSTEM, METHOD AND DEVICE WITH ADJUSTABLE DEADBAND

RELATED APPLICATIONS

This patent application claims priority under 35 U.S.C. 119(e) of the U.S. Provisional Patent Application No. 63/425,251, filed Nov. 14, 2022, entitled "SILENT BICYCLE FREEWHEEL HUB WITH ADJUSTABLE ENGAGEMENT DEADBAND," which is hereby incorporated by reference.

FIELD OF THE INVENTION

The present invention is generally directed to freewheel hubs. More specifically, the present invention is directed to a freewheel hub whose deadband is able to be adjusted as desired.

BACKGROUND OF THE INVENTION

Most bicycles today utilize a freewheel hub in the rear wheel to allow the rear wheel to "freewheel" or roll forward without requiring the rest of the bicycle drivetrain to move continuously. A typical freewheel hub uses one or more spring-loaded pawls mounted to a freehub body, moving inside a toothed ratchet gear attached to the hub shell. As the bicycle rolls forward, the pawls "ratchet" across the teeth of the toothed ratchet gear, disconnecting the bicycle cassette, chain, sprocket and cranks from the rear wheel.

When the rider resumes forward pedaling, there will be a certain amount of relative movement between the freehub body and the hub shell prior to a spring loaded pawl engaging with the toothed ratchet gear. This relative motion and/or a distance thereof is the deadband of the ratchet mechanism. Specifically, the deadband is able to be the mechanical distance the freehub body may move and/or rotate relative to the toothed ratchet gear before hub engagement occurs. In a traditional freewheel hub, this deadband distance is dependent on the number of teeth in the toothed ratchet gear. Typical toothed ratchet gears have between 12 and 70 teeth, sometimes more. In this traditional hub design, the deadband distance can often be zero or close to zero based on the number of ratchet teeth. Depending on when and how fast the rider begins pedaling (and thus begins rotating the freehub in the engagement direction), and how fast the rider is coasting at the time, there will be a time delay before torque is transferred from the bicycle cassette to the bicycle wheel (due to the engagement of the pawls of the freewheel with the ratchet gear of the hub shell. However, the contribution to that time from the freehub design can most easily be considered in mechanical terms, and the mechanical deadband is a direct input to this time delay.

A drawback of the freehubs having a zero or close to zero deadband is observed in the form of pedal kickback, in particular when a freewheel hub is used with a full-suspension bicycle. A full-suspension bicycle mounts the rear wheel on a swingarm or linkage, which allows the rear wheel to move up and down as the bicycle traverses bumps in the road or trail. Typical full suspension linkages include a certain amount of chainstay length growth as the suspension moves through its travel, where the chainstay length is the distance between the rear hub axle and the bicycle crankset spindle. As the suspension compresses, this distance grows, and since the bicycle chain traverses this distance from the crank chainring to the bicycle cassette, the chain will have tension applied to it as the chainstay length grows.

Under certain circumstances, a rider might be coasting with their weight on the bicycle pedals when a particularly large and abrupt compression is induced in the suspension, for instance if the rider rides their bicycle over a large bump at high speed, or lands off a jump and the suspension must absorb a large amount of energy quickly. Under these circumstances, the chain tension from chainstay length growth will rotate the freewheel forward quickly with great force, and may cause the freewheel ratchet mechanism to engage. If the rear wheel is in contact with the ground, the chain force will counteract the suspension movement and will reduce the efficiency of the suspension system in absorbing bump force. The chain force will also apply a reversing torque to the bicycle pedal crank, which may be felt by the rider as "pedal kickback," wherein pedal kickback denotes both the sensation of pedal movement felt by the rider, as well as the reduction in suspension efficiency owing to the momentary chain load in the system.

The likelihood of pedal kickback in this scenario is increased by an increase in the number of ratchet teeth in the freewheel hub ratchet because it reduces the deadband distance of the system. Thus, traditional freewheel hubs have the drawback of the rider being likely to experience pedal kickback which is only exacerbated when combined with a full-suspension bicycle. Indeed, certain hubs use a sprag-clutch engagement mechanism instead of ratchet pawls, and indeed they reduce the deadband distance to zero. These hubs would therefore be most likely to experience pedal kickback under rapid suspension movements. Bicycles with more suspension travel and large chainstay length growths will also be more likely to experience pedal kickback. Also it should be obvious that the number of teeth on the toothed crank sprocket and the toothed cassette sprocket in use on rapid suspension movement will have an effect on pedal kickback force, since the resting position of the chain is controlled by the relative sizes of these sprockets.

SUMMARY OF THE INVENTION

A freewheel hub having a non-zero deadband distance in order to reduce or eliminate pedal kickback. This allows the freehub body to always move through a prescribed free motion before hub engagement, regardless of the relative position of the freehub body and the hub shell, and regardless of the number of teeth in the freehub ratchet mechanism. The deadband distance is able to have and/or be adjusted to a desired length including lengths that enable silent freewheeling operation where the pawls of the freewheel body do not engage or contact the teeth of the ratchet gear thereby eliminating any contact-based freewheeling sound. For example, the rider is able to adjust the hub deadband by adding and including an adjustable deadband key to the freewheel body that changes the deadband length and may allow the rider to reduce or eliminate pedal kick-back and improve suspension function on certain bicycles under certain riding conditions, to their own liking and comfort level. Further, if adjusted to a sufficiently long deadband length, in addition to improving suspension function, the rider is able to eliminate the clicking noise inherent in using spring-loaded pawls in the ratchet mechanism. Instead, the freehub pawls are only pressed against the ratchet teeth when the rider pedals forward and engages the hub. This allows silent coasting on the bicycle, which many riders find to be a pleasant experience.

A first aspect is directed to a bicycle hub system. The system comprises a bicycle wheel including a hub shell assembly, the hub shell assembly having a central aperture for receiving an axle, a ratchet gear bore and a toothed ratchet gear positioned within the ratchet gear bore and a freehub assembly including an outer hub sprocket attachment feature, a pawl support member having a plurality of pawl pivot channels, a plurality of pawls pivotably coupled within the pivot channels, and a biasing member that applies a biasing force to the plurality of pawls that resists the pivoting of the plurality of pawls away from a deadband surface of the pawl support member, wherein the pawl support member is positioned within the toothed ratchet gear such that when the freehub assembly is rotated in a first direction with respect to the hub shell assembly, the plurality of pawls are able to pivot away from the pawl support member until the plurality of pawls engage teeth of the toothed ratchet gear causing the hub shell assembly to rotate with the freehub assembly in the first direction.

In some embodiments, the biasing member is a spring that impedes the pivoting of the plurality of pawls away from the pawl support member. In some embodiments, each the plurality of pawls include a groove for receiving the biasing member. In some embodiments, when fully rotated toward the deadband surface, the plurality of pawls are unable to contact the teeth of the toothed ratchet gear. In some embodiments, the system further comprises a pawl pusher having a plurality of pushing fingers positioned along the deadband surface of the pawl support member. In some embodiments, when the freehub assembly is rotated in the first direction with respect to the hub shell assembly, the pushing fingers slide along the deadband surface of the pawl support member and push against tips of the plurality of pawls and thereby forcing the plurality of pawls to pivot away from the deadband surface of the pawl support member. In some embodiments, the hub shell assembly further comprises a one-way clutch that is operatively coupled with the pawl pusher such that the clutch prevents rotation of the pushing fingers in the first direction with respect to the hub shell assembly and thereby causes the pushing fingers to slide along the deadband surface when the freehub assembly is rotated in the first direction with respect to the hub shell assembly. In some embodiments, the deadband surface extends between each of the pivot channels and a corresponding stop wall of a plurality of stop walls of the pawl support member thereby forming a plurality of deadband cavities adjacent to the deadband surface.

In some embodiments, a different pair of one of the plurality of pawls and one of the plurality of pushing fingers is positioned at least partially within each of the deadband cavities when the plurality of pawls are fully rotated against the deadband surface. In some embodiments, when the freehub assembly rotates with respect to the hub shell assembly in a second direction opposite the first direction, each of the pushing fingers slides along the deadband surface until the pushing finger abuts one of the stop walls. In some embodiments, the freehub assembly further comprises a deadband adjustment key configured to selectively couple to a key slot of the pawl support member, the key slot positioned adjacent to one of the deadband recesses. In some embodiments, when coupled within the key slot, a block of the deadband adjustment key extends into the one of the deadband recesses adjacent to the stop wall such that when the freehub assembly rotates with respect to the hub shell assembly in the second direction, each of the pushing fingers slides along the deadband surface until one of the pushing fingers abuts the block of the deadband adjustment key. In some embodiments, the outer hub sprocket attachment feature is an outer cassette spline for coupling with one or more sprockets.

A second aspect is directed to a bicycle hub assembly. The bicycle hub assembly comprises a toothed ratchet gear having a plurality of teeth and a freehub assembly including a pawl support member having a plurality of pawl pivot channels, a plurality of pawls pivotably coupled within the pivot channels, and a biasing member that applies a biasing force to the plurality of pawls that resists the pivoting of the plurality of pawls away from a deadband surface of the pawl support member, wherein the pawl support member is positioned within the toothed ratchet gear such that when the freehub assembly is rotated in a first direction with respect to the toothed ratchet gear, the plurality of pawls are able to pivot away from the pawl support member until the plurality of pawls engage the teeth of the toothed ratchet gear causing the toothed ratchet gear to rotate with the freehub assembly in the first direction.

In some embodiments, the biasing member is a spring that impedes the pivoting of the plurality of pawls away from the pawl support member. In some embodiments, each the plurality of pawls include a groove for receiving the biasing member. In some embodiments, when fully rotated toward the deadband surface, the plurality of pawls are unable to contact the teeth of the toothed ratchet gear. In some embodiments, the assembly further comprises a pawl pusher having a plurality of pushing fingers positioned along the deadband surface of the pawl support member. In some embodiments, when the freehub assembly is rotated in the first direction with respect to the toothed ratchet gear, the pushing fingers slide along the deadband surface of the pawl support member and push against tips of the plurality of pawls and thereby forcing the plurality of pawls to pivot away from the deadband surface of the pawl support member. In some embodiments, the assembly further comprises a one-way clutch that is operatively coupled with the pawl pusher such that the clutch prevents rotation of the pushing fingers in the first direction with respect to the toothed ratchet gear and thereby causes the pushing fingers to slide along the deadband surface when the freehub assembly is rotated in the first direction with respect to the toothed ratchet gear.

In some embodiments, the deadband surface extends between each of the pivot channels and a corresponding stop wall of a plurality of stop walls of the pawl support member thereby forming a plurality of deadband cavities adjacent to the deadband surface. In some embodiments, a different pair of one of the plurality of pawls and one of the plurality of pushing fingers is positioned at least partially within each of the deadband cavities when the plurality of pawls are fully rotated against the deadband surface. In some embodiments, when the freehub assembly rotates with respect to the toothed ratchet gear in a second direction opposite the first direction, each of the pushing fingers slides along the deadband surface until the pushing finger abuts one of the stop walls. In some embodiments, the freehub assembly further comprises a deadband adjustment key configured to selectively couple to a key slot of the pawl support member, the key slot positioned adjacent to one of the deadband recesses. In some embodiments, when coupled within the key slot, a block of the deadband adjustment key extends into the one of the deadband recesses adjacent to the stop wall such that when the freehub assembly rotates with respect to the toothed ratchet gear in the second direction, each of the pushing fingers slides along the deadband surface until one of the pushing fingers abuts the block of the deadband adjustment key. In some embodiments, the free-hub assembly includes an outer hub sprocket attachment feature for coupling with one or more sprockets.

A third aspect is directed to a method of providing a bicycle hub system. The method comprises providing a hub shell assembly including a toothed ratchet gear positioned within a ratchet gear bore, the hub shell assembly for coupling with a bicycle wheel rim via a plurality of spokes and providing a freehub assembly including an outer hub sprocket attachment feature, a pawl support member having a plurality of pawl pivot channels, a plurality of pawls pivotably coupled within the pivot channels, and a biasing member that applies a biasing force to the plurality of pawls that resists the pivoting of the plurality of pawls away from a deadband surface of the pawl support member and coupling the freehub assembly with the hub shell assembly such that the pawl support member is positioned within the toothed ratchet gear and when the freehub assembly is rotated in a first direction with respect to the hub shell assembly, the plurality of pawls are able to pivot away from the pawl support member until the plurality of pawls engage teeth of the toothed ratchet gear causing the hub shell assembly to rotate with the freehub assembly in the first direction.

In some embodiments, the biasing member is a spring that impedes the pivoting of the plurality of pawls away from the pawl support member. In some embodiments, each the plurality of pawls include a groove for receiving the biasing member. In some embodiments, when fully rotated toward the deadband surface, the plurality of pawls are unable to contact the teeth of the toothed ratchet gear. In some embodiments, the freehub assembly further comprises a pawl pusher having a plurality of pushing fingers positioned along the deadband surface of the pawl support member. In some embodiments, when the freehub assembly is rotated in the first direction with respect to the hub shell assembly, the pushing fingers slide along the deadband surface of the pawl support member and push against tips of the plurality of pawls and thereby forcing the plurality of pawls to pivot away from the deadband surface of the pawl support member. In some embodiments, the hub shell assembly further comprises a one-way clutch that is operatively coupled with the pawl pusher such that the clutch prevents rotation of the pushing fingers in the first direction with respect to the hub shell assembly and thereby causes the pushing fingers to slide along the deadband surface when the freehub assembly is rotated in the first direction with respect to the hub shell assembly.

In some embodiments, the deadband surface extends between each of the pivot channels and a corresponding stop wall of a plurality of stop walls of the pawl support member thereby forming a plurality of deadband cavities adjacent to the deadband surface. In some embodiments, a different pair of one of the plurality of pawls and one of the plurality of pushing fingers is positioned at least partially within each of the deadband cavities when the plurality of pawls are fully rotated against the deadband surface. In some embodiments, when the freehub assembly rotates with respect to the hub shell assembly in a second direction opposite the first direction, each of the pushing fingers slides along the deadband surface until the pushing finger abuts one of the stop walls. In some embodiments, the freehub assembly further comprises a deadband adjustment key configured to selectively couple to a key slot of the pawl support member, the key slot positioned adjacent to one of the deadband recesses. In some embodiments, the method further comprises sliding the deadband adjustment key into the key slot such that a block of the deadband adjustment key extends into the one of the deadband recesses adjacent to the stop wall and when the freehub assembly rotates with respect to the hub shell assembly in the second direction, each of the pushing fingers slides along the deadband surface until one of the pushing fingers abuts the block of the deadband adjustment key. In some embodiments, the outer hub sprocket attachment feature is an outer cassette spline for coupling with one or more sprockets.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the application are directed to a bicycle and/or a freewheel hub having a non-zero deadband distance in order to reduce or eliminate pedal kickback. This allows the freehub body to always move through a prescribed free motion before hub engagement, regardless of the relative position of the freehub body and the hub shell, and regardless of the number of teeth in the freehub ratchet mechanism. The deadband distance is able to have and/or be adjusted to a desired length including lengths that enable silent freewheeling operation where the pawls of the freewheel body do not engage or contact the teeth of the ratchet gear thereby eliminating any contact-based freewheeling sound.

Reference will now be made in detail to implementations of a bicycle and/or freewheel hub, such as illustrated in the accompanying drawings. The same reference indicators will be used throughout the drawings and the following detailed description to refer to the same or like parts. In the interest of clarity, not all of the routine features of the implementations described herein are shown and described. It will be appreciated that in the development of any such actual implementation, numerous implementation-specific decisions can be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figures 1, 2:
FIG. 1 illustrates a side view of a bicycle assembly according to some embodiments.
FIG. 2 illustrates a detailed view of a rear triangle of a bicycle assembly according to some embodiments.

FIG. 1 illustrates a bicycle assembly 200 according to some embodiments. As shown in FIG. 1, the bicycle assembly 200 comprises a bicycle rear wheel 202 (including a hub assembly 1), a bicycle front triangle 204 and a bicycle rear triangle 206 coupled with the front triangle 204. The bicycle front triangle 204 and bicycle rear triangle 206 are coupled together via a bicycle suspension link 216, which compresses a bicycle rear shock absorber 210 that is coupled between the front triangle 204 and the suspension link 216. The assembly 200 further comprises a bicycle crank 208 operably coupled with a bicycle chainring 209 engaged with a bicycle chain 212. A bicycle cassette 214 is mounted to the bicycle rear wheel 202, which is engaged to said bicycle chain 212. A bicycle rear derailleur 215 is engaged to said chain 212 and mounted to said rear triangle 206 proximate said rear wheel 202. Alternatively, one or more of the above components are able to be omitted. Further, although only the components above are described in detail, it is understood that the bicycle assembly 200 is able to comprise one or more other components well known in the art that are not described herein for the sake of brevity.

FIG. 2 illustrates a detailed view of the bicycle rear triangle 206 and bicycle rear wheel 202 according to some embodiments. As shown in FIG. 2, overlaid geometry shows the Axle Position Resting AR, Axle Position Compressed AC, Wheel Path WP, Bicycle Chainstay Length L1 and Bicycle Chainstay Length L2. In particular, this geometry is overlaid to demonstrate the change to the bicycle frame geometry under suspension compression. When not under significant compression, the axle is at position AR and the chainstay length is equal to L1. When under compression, the axle moves along path WP to position AC thereby increasing the chainstay length to L2. As described above, this increase in chainstay length can abruptly rotate the freewheel body with respect to the freewheel shell and thereby cause pedal kickback if the deadband is zero or minimal.

Figures 3, 4:
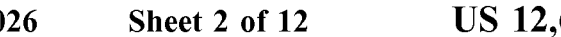
FIG. 3 illustrates a perspective view of a hub assembly according to some embodiments.
FIG. 4 illustrates an exploded view of the hub assembly according to some embodiments.

FIG. 3 illustrates a perspective view of the hub assembly 1 according to some embodiments. As shown in FIG. 3, the hub assembly 1 comprises first end 2, second end 4, and hub central axis 6. FIG. 4 illustrates a perspective exploded view of the hub assembly 1 according to some embodiments. As shown in FIG. 4, the hub assembly comprises a hub shell assembly 30, a freehub body assembly 100, a hub axle 14 and a hub axle cap 10. Both the hub shell assembly 30 and the freehub body assembly 100 are able to slide onto the hub axle 14 such that they are located on a hub axle bearing surface 20. The hub axle cap 10 is able to be threaded onto said axle 14 with a hub axle cap thread 12 threading onto a hub axle thread 16, such that the hub axle right end 18 is opposite said end cap 10 with the assemblies 30, 100 in between.

Figures 5, 6:
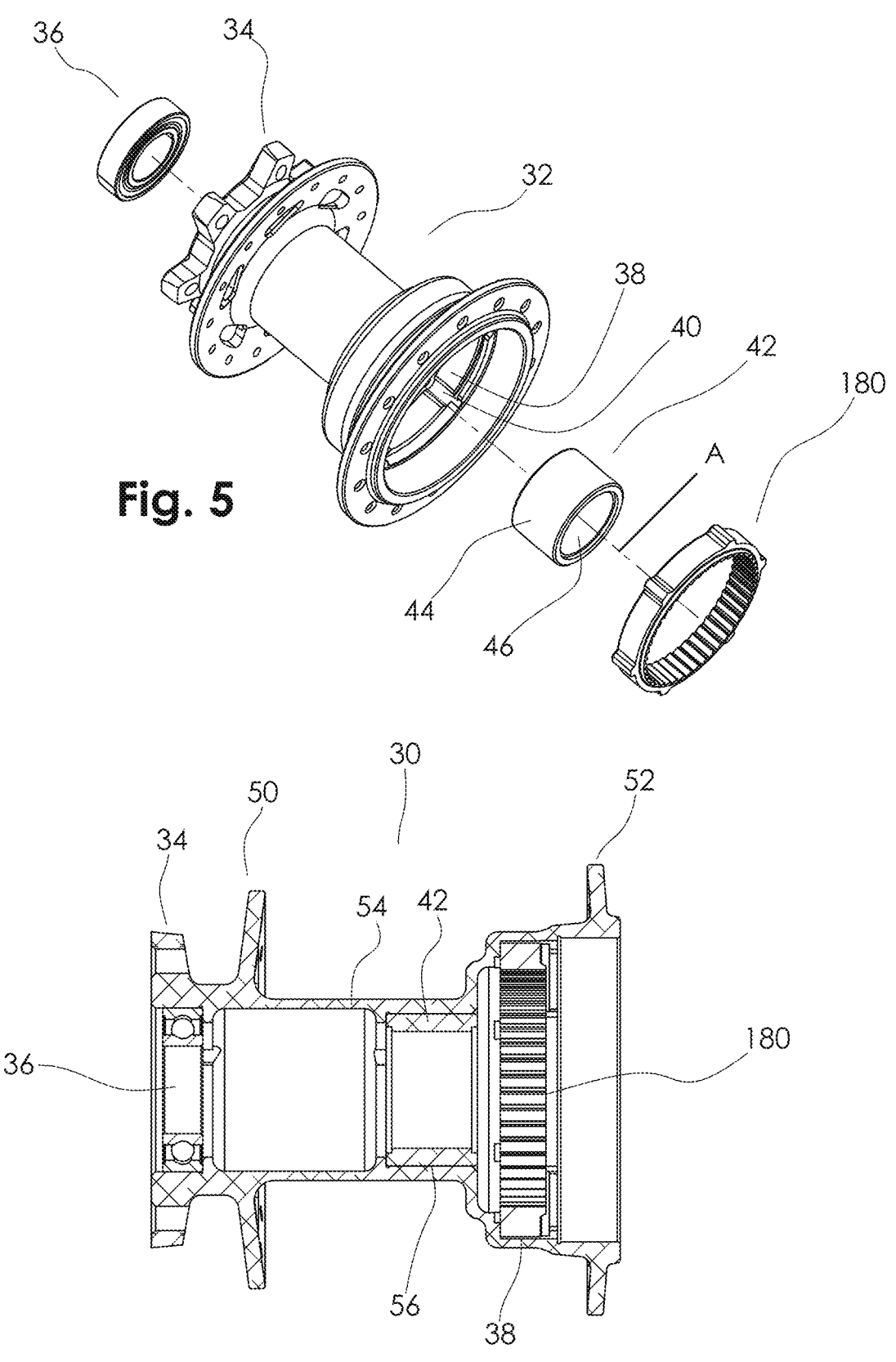
FIG. 5 illustrates an exploded view of a hub shell assembly according to some embodiments.
FIG. 6 illustrates a cross-section view of the hub shell assembly along line A shown in FIG. 5 according to some embodiments.

FIG. 5 illustrates an exploded perspective view of the hub shell assembly 30 according to some embodiments. As shown in FIG. 5, the hub shell assembly 30 comprises a hub shell 32, a hub shell disc flange 34, a hub shell bearing 36, a hub shell ratchet gear bore 38, one or more hub shell ratchet gear spline slots 40, a one-way clutch 42 having an outer race 44 and an inner bore 46, and a toothed ratchet gear 180. In some embodiments, the one-way clutch is a sprag clutch. Alternatively, the one-way clutch 42 is able to be other types of over-running or one-way clutches, including but not limited to a roller clutch, a pawl clutch, a wound-spring type clutch, a face-gear clutch, and/or other similar clutches. Some of these clutches would not allow for silent hub operation, but they would allow for the same adjustable deadband operation of the hub 1.

FIG. 6 illustrates a cross-section view of the hub shell assembly 30 at section line according to some embodiments. As shown in FIG. 6, the hub shell 32 comprises a hub shell body 54, hub shell disc flange 34 (e.g. for coupling with a brake rotor), hub shell left spoke flange 50 and hub shell right spoke flange 52 (e.g. both for coupling with one or more spokes (not shown)). Further, as shown in FIG. 6, the hub shell bearing 36 is able to be positioned within a bearing cavity within the flange 34 (e.g. for receiving axle 14), the one-way clutch 42 is able to be fitted into hub shell clutch bore 56 (e.g. for receiving the stem 142 of the pusher 140, and the ratchet gear 180 is able to be positioned within the hub shell ratchet bore 38. In particular, when positioned within the hub shell ratchet bore 38, each of a plurality of ratchet ring spline teeth 184 (see FIG. 15) of the ratchet ring 180 extend into a different one of the hub shell ratchet spline slots 40. As a result, when the ratchet ring 180 is rotated, the ratchet ring spline teeth 184 apply a force to the ratchet spline slots 40 thereby causing the hub shell 32 to similarly rotate. Additionally, the outer surface of the stem 142 of the pusher 140 is able to contact the inner bore 46 of the one-way clutch 42 such that the inner bore 46 rotates with the pusher 140 in a first direction of rotation, but resists and/or stops rotation of the pusher 140 in the opposite direction (e.g. via friction between the outer surface of the stem 142 and the inner bore 46).

Figure 7:
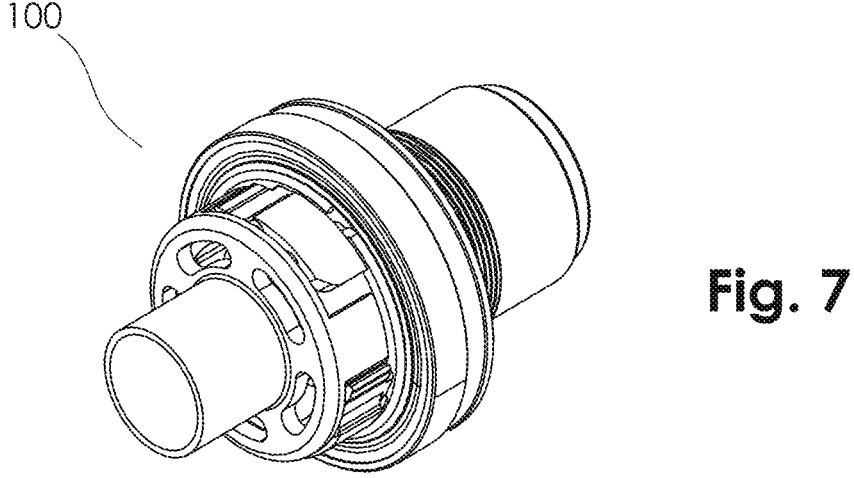
FIG. 7 illustrates a perspective view of a freehub body assembly according to some embodiments.
Figure 8:
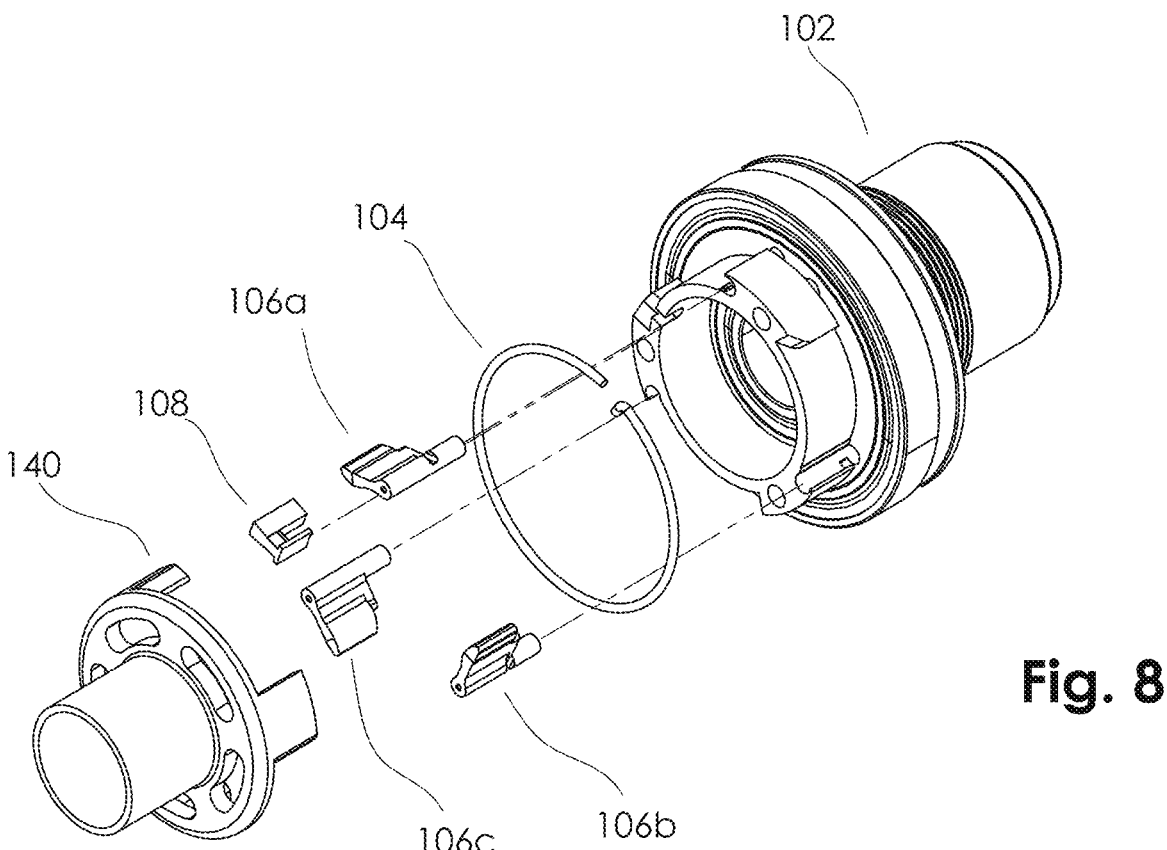
FIG. 8 illustrates a partially exploded view of the freehub body assembly according to some embodiments.

FIGS. 7 and 8 illustrates perspective and partially exploded perspective views, respectively, of the freehub body assembly 100 according to some embodiments. As shown in FIGS. 7 and 8, the freehub body assembly 100 comprises a bearing assembly (or pawl support member) 102, a pawl pusher 140, a deadband adjustment key 108, one or more ratchet pawls 106*a-c*, and a pawl biasing element 104. In some embodiments, the biasing element 104 is a wire spring. Alternatively, the biasing element 104 is able to be other types of biasing elements including, but not limited to, one or a combination of one or more leaf springs, one or more coil springs, one or more rubber bands, one or more magnets (e.g. placed in the freehub body under steel pawls 106), and/or any other kind of spring loading mechanism.

Figures 9, 10:
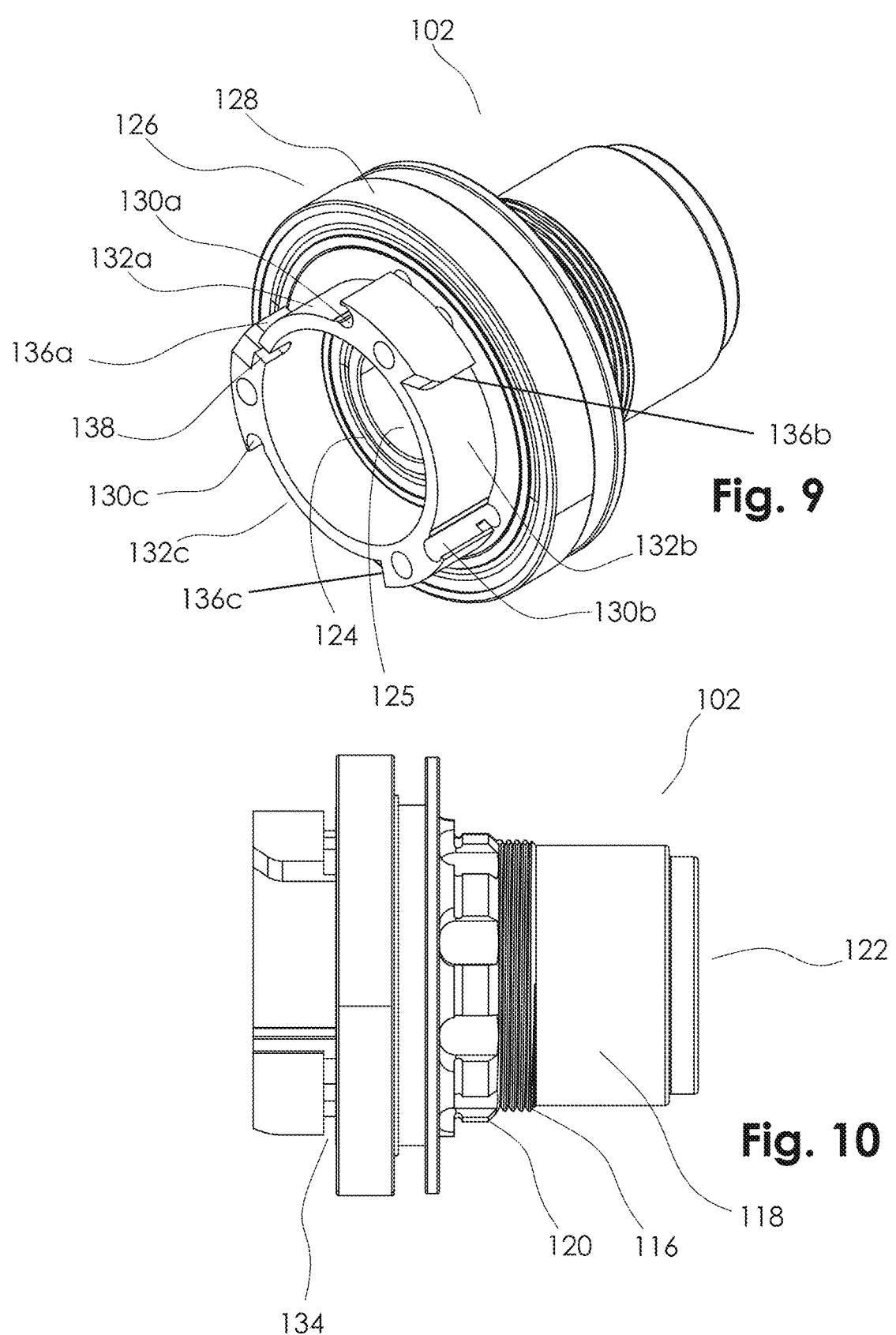
FIG. 9 illustrates a perspective view of a freehub bearing assembly according to some embodiments.
FIG. 10 illustrates a side view of the freehub bearing assembly according to some embodiments.

FIGS. 9 and 10 illustrate perspective and side views, respectively, of the bearing assembly 102 according to some embodiments. As shown in FIGS. 9 and 10, the bearing assembly 102 comprises a freehub end bearing 122 (e.g. for receiving the axle 14), a freehub external bearing 126 with an external bearing outer race 128, a freehub internal bearing 124 with an internal bearing inner race 125 (e.g. for receiving the axle 14), a cassette spline 120, a cassette mounting thread 116, a cassette mounting boss 118, a biasing element slot 134, one or more pawl cylinder slots 130*a-c*, one or more deadband surfaces 132*a-c*, one or more pusher stop surfaces 136*a-c*, and a deadband adjustment key slot 138. The cassette spline 120 and/or cassette mounting boss 118 is able to receive a splined cassette (not shown) in order to coupled with a drive assembly of the bicycle 200 (e.g. the bicycle crank 208, the bicycle chainring 209, the bicycle chain 212, the derailleur 215 and/or other components). A cassette locking bolt (not shown) is able to threadably couple to the cassette mounting thread 116 to secure the cassette onto the spline 120. Although as shown in FIGS. 9 and 10, the bearing assembly 102 comprises three pawl cylinder slots 130*a-c*, deadband surfaces 132*a-c* and pusher stop surfaces 136*a-c*, and a single deadband reducer slot 138, more or less pawl cylinder slots 130*a-c*, deadband surfaces 132*a-c*, pusher stop surfaces 136*a-c*, and deadband reducer slots 138 are contemplated.

Similarly, although as shown in FIGS. 7 and 8, the freehub body assembly 100 comprises a pawl pusher 140 having three fingers 144, a single deadband adjustment key 108, three ratchet pawls 106*a-c* and a single pawl biasing element 104, a pawl pusher 140 having more or less fingers 144, more or less deadband adjustment keys 108, more or less ratchet pawls 106*a-c* and/or more or less pawl biasing elements 104 are contemplated. In particular, the number of deadband adjustment keys 108 is able to correspond to the number of deadband adjustment key slots 138, and the number of fingers 144, cylinder slots 130*a-c*, deadband surfaces 132*a-c* and stop surfaces 136*a-c* is able to correspond to the number of pawls 106*a-c*. The space defined between each of the pawl cylinder slots 130*a-c*, the corresponding stop surface 136*a-c* and the corresponding deadband surface 132*a-c*, is able to form a plurality of deadband cavities that are filled by the fingers 144 of the pusher 140, the pawls 106*a-c* (at least in a fully retracted position) and the deadband adjustment key 108 (when coupled within the deadband adjustment key slot 138).

Figures 11, 12:
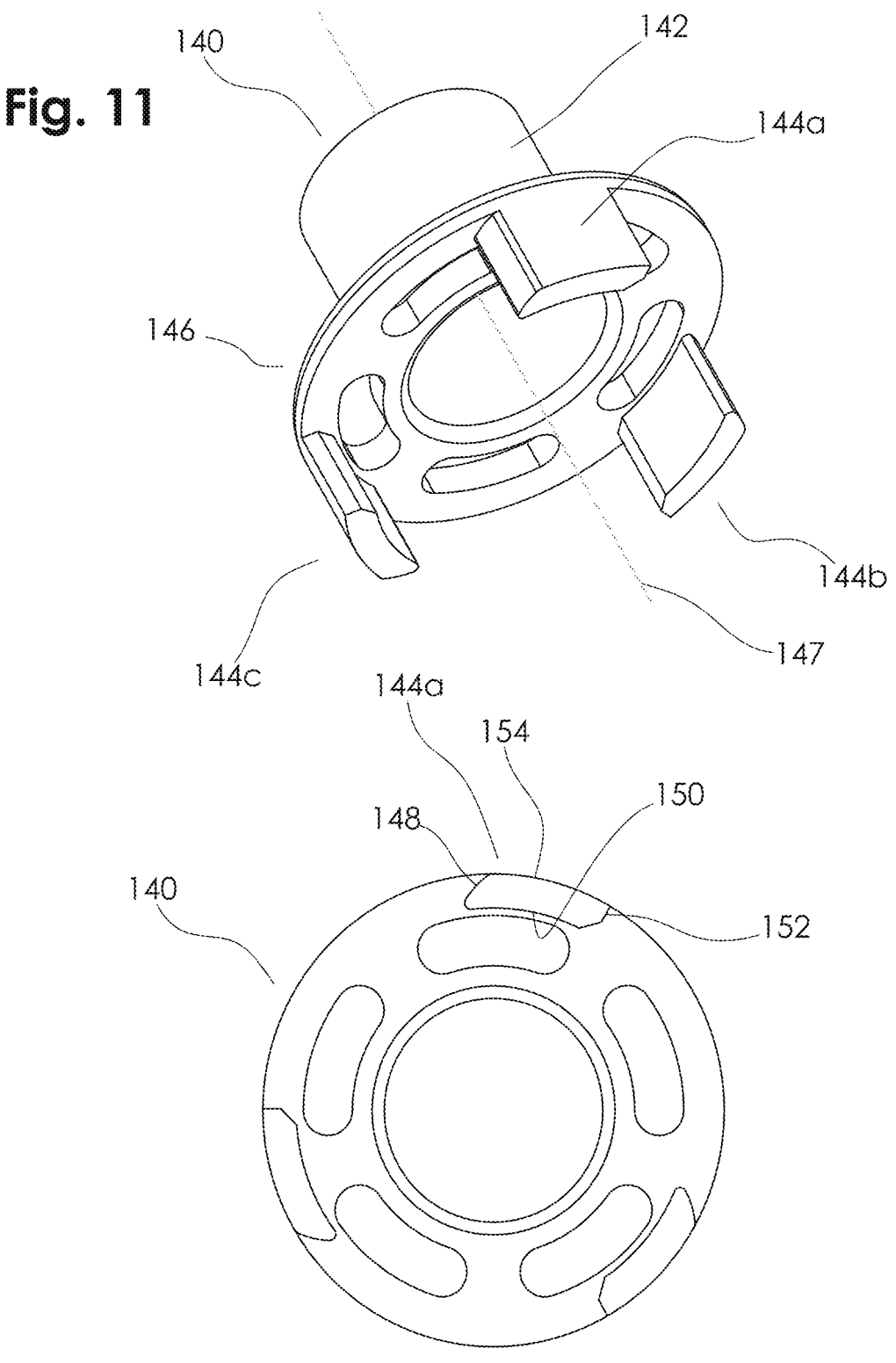
FIG. 11 illustrates a perspective view of a pawl pusher according to some embodiments.
FIG. 12 illustrates a right end view of the pawl pusher according to some embodiments.

FIGS. 11 and 12 illustrate perspective and front views, respectively, of the pawl pusher 140 according to some embodiments. As shown in FIGS. 11 and 12, the pawl pusher 140 comprises a central cavity 147 (for receiving the axle 14), a stem or clutch cylinder 142, a finger flange 146 and one or more pawl fingers 144*a-c*. Each of the fingers 144 comprise finger pawl surface 148, finger outside diameter

154, finger locating cylinder 150, and pusher freewheel stop 152. In operation, the locating cylinder 150 of the pawl fingers 144 is able to slide along the deadband surface 132*a-c* within the deadband cavities between the pawls 106*a-c* and the stop walls 136*a-c* or an inserted key 108. As a result, the pawl surface 148 is able to slide under the pawl pusher cam surface 166 (see FIG. 14) in order to cause the pawls 106*a-c* to pivot from the retracted position to the extended position. When slide in the opposite direction, the pusher freewheel stop 152 is able to contact the stop walls 136*a-c* and/or the inserted key 108 (thereby defining the deadband distance).

Figure 13:
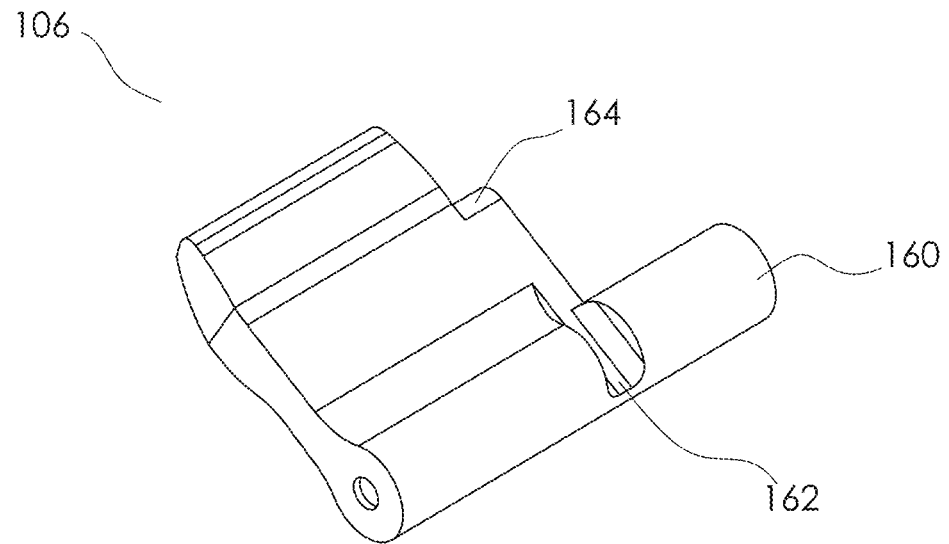
FIG. 13 illustrates a perspective view of a ratchet pawl according to some embodiments.
Figure 14:
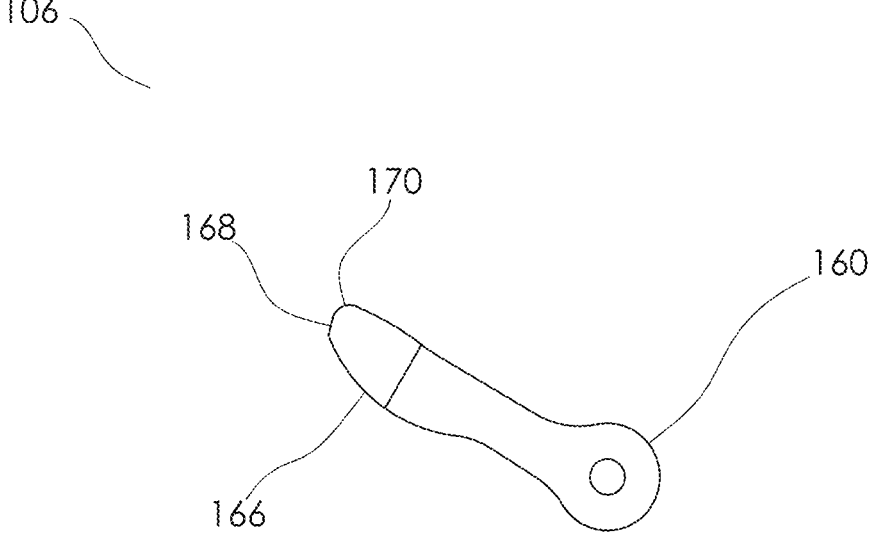
FIG. 14 illustrates an end view of the ratchet pawl according to some embodiments.

FIGS. 13 and 14 illustrate perspective and end views, respectively, of a ratchet pawl 106*a-c* according to some embodiments. As shown in FIGS. 13 and 14, the ratchet pawl 106*a-c* comprises a pawl cylinder 160, a pawl biasing element groove 162, a pawl spring pad 164, a pawl pusher cam surface 166, a pawl driving surface 168 and a pawl tip radius 170. The pawl pusher cam surface 166 is for sliding over the pusher fingers 144 as described above. The pawl driving surface 168 is configured to engage the ratchet tooth receiving face 186 and/or the pawl tip radius 170 is configured to fit within the valleys between the teeth 185 of the ratchet gear 180 (thereby engaging and causing the gear 180 to rotate with the freehub assembly 100).

The pawl cylinder 160 of each of the pawls 106*a-c* is able to slidably fit within one of the pawl cylinder slots 130*a-c*. When positioned within one of the slots 130*a-c*, the pawls 106*a-c* are able to pivot about a central axis of the slot 130 between a retracted position adjacent to the respective deadband surface 132*a-c* and an extended position away from the deadband surface 132*a-c*. The biasing element 104 is able to fit withing the gap 134 (see FIG. 10) at least partially surrounding or blocking the pivoting of pawls 106*a-c* away from the deadband surface 132*a-c*. In particular, the biasing element 104 is able to be positioned within the pawl biasing element groove 162 and adjacent to or around the pawl spring pad 164 of each of the pawls 106*a-c* in order to resist the pivoting away from the deadband surface 132*a-c* and/or bias the pawls 106*a-c* in the retracted position. Indeed, by providing a shortened pad 164, the pawls 106*a-c* enable the biasing element 104 to have a smaller diameter and/or size and be closer to the deadband surface 132*a-c*.

When in the extended position (see FIGS. 21 and 22), the pawls 106*a-c* are pivoted away from the deadband surface 132*a-c* such that they are able to engage the teeth 185 of the ratchet gear 180 (e.g. contact a ratchet tooth receiving face 186 and/or a bottom of the valley between teeth 185). In some embodiments, when in the retracted position the pawls 106*a-c* are able to contact the deadband surface 132*a-c* and/or be positioned fully within the corresponding deadband cavity (e.g. when the corresponding pusher finger 144 is able to slide to be adjacent to a stop wall 136*a-c* or able to slide to be adjacent to the inserted key 108, but still does not impede or block the pivoting of the corresponding pawl 106*a-c* (see FIGS. 19 and 20)). Alternatively, when in the retracted position the pawls 106*a-c* are able to be at least partially blocked from contacting the deadband surface 132*a-c* and/or from being positioned fully within the corresponding deadband cavity (e.g. when despite being fully slide against an inserted key 108, the corresponding pusher finger 144 impedes or blocks the pivoting of the corresponding pawl 106*a-c* toward the deadband surface 132*a-c*). In particular, by inserting and/or selecting a size of the key 108, a user is able to adjust the retracted position by adjusting how close the fingers 144 are to the pawls 106a-c and/or the extent that the fingers 144 block the inward pivoting of the pawls 106a-c.

Figure 15:
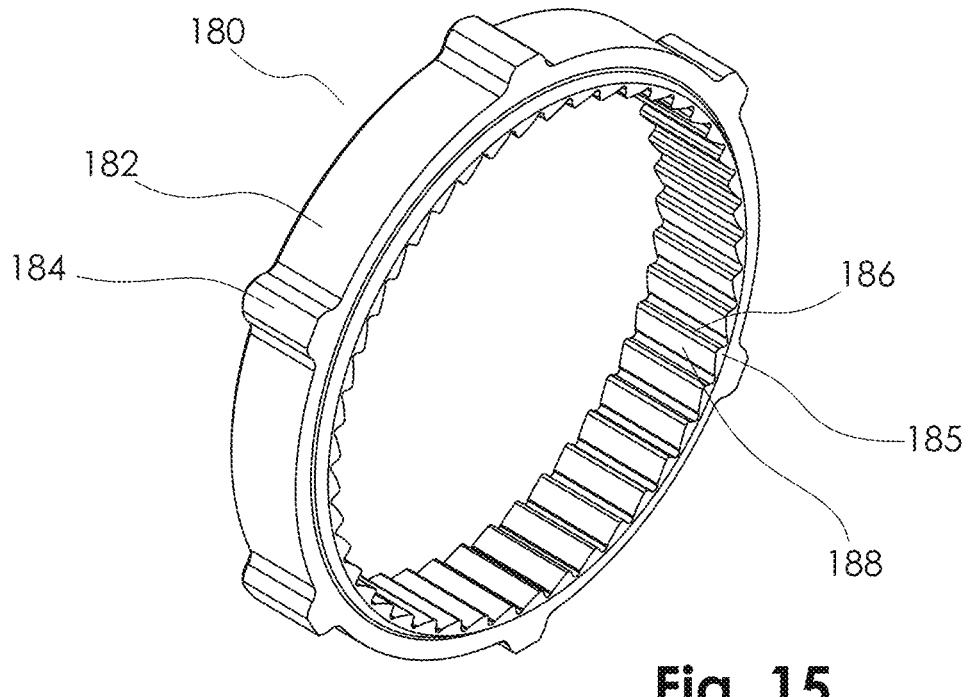
FIG. 15 illustrates a perspective view of a ratchet gear ring according to some embodiments.
Figure 16:
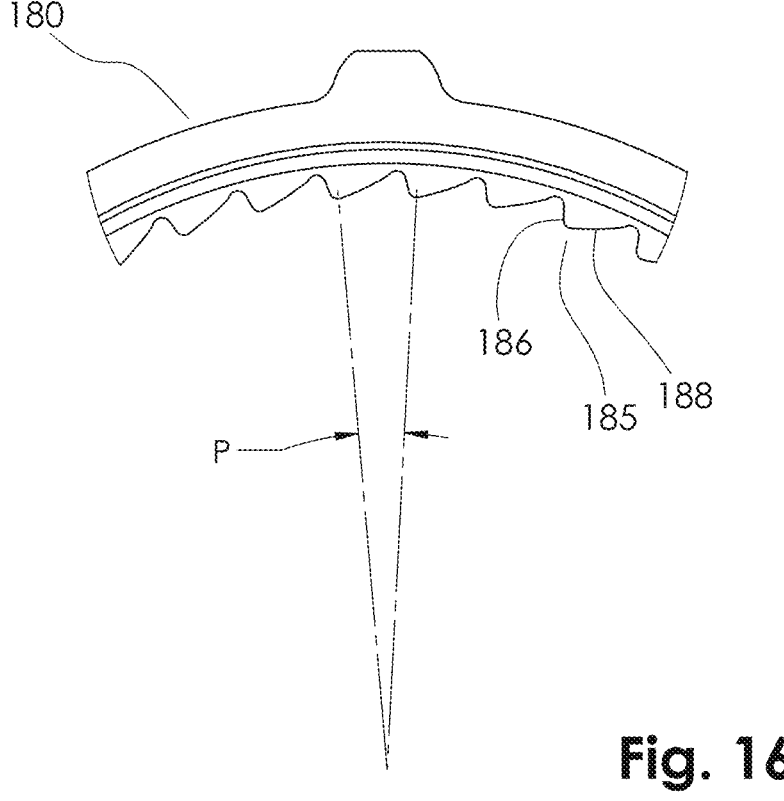
FIG. 16 illustrates a side detail view of the ratchet gear ring according to some embodiments.

FIGS. 15 and 16 illustrate perspective and detail views, respectively, of the toothed ratchet gear 180 according to some embodiments. As shown in FIG. 15, the toothed ratchet gear 180 comprises a ring-shaped body having an outside surface 182, one or more outer splines 184 protruding from the outside surface 182 of the body, and a plurality of inner teeth 185 protruding from an inner surface of the body. Each of the inner teeth 185 have a ratchet tooth receiving face 186 and a ratchet tooth sliding face 188 with a valley formed where the sliding face 188 of each tooth meets the receiving face 186 of the adjacent tooth 185. A ratchet tooth pitch angle P is shown as the angle between two adjacent teeth 185. The sliding face 188 is able to be longer and/or make a smaller angle with respect to the adjacent inner surface of the body than the receiving face 186. Additionally, the shape, contour and/or size of the pawl driving surface 168 and the pawl tip radius 170 of each of the pawls 106a-c is able to compliment the shape of the valleys and/or curvature of the sliding face 188.

As a result, when the pawls 106a-c are extended such that they contact the teeth 185 and moved/rotated in a direction from the valley in between teeth 185 along the adjacent sliding face 188, the smaller angle enables the pawls 106a-c to slide over the teeth 185 without engaging the teeth 185. In contrast, when moved/rotated in the opposite direction from the valley in between teeth 185 along the adjacent receiving face 186, the larger/steeper angle causes the pawl driving surface 168 and/or the pawl tip radius 170 to catch against the receiving face 186 and/or within the valleys thereby engaging the teeth 185 and forcing the ring to rotate in the same direction as the pawls 106a-c. Alternatively, the sliding and receiving faces 186, 188 are able to be the same length and/or angle.

Figure 17:
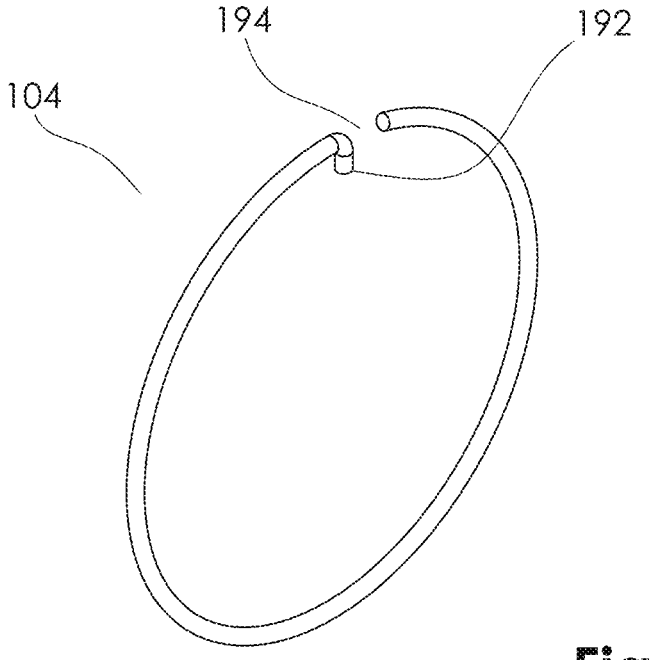
FIG. 17 illustrates a perspective view of a biasing element according to some embodiments.

FIG. 17 illustrates a perspective view of the biasing element 104 according to some embodiments. As shown in FIG. 17, the biasing element 19 comprises an elongated body shaped to surround each of the pawls 106a-c, the body having a gap 194 enabling the body to flex to fit around the pawls 106a-c before springing back to shape, and a tang 192 to catch on one or more of the pawls 106a-c and thereby prevent the biasing element 104 from rotating with respect to the pawls 106a-c. The biasing element 104 is able to comprise a flexible material or combination of materials including, but not limited to, rubber, metal, plastic or other flexible material known in the art. As described above, the biasing element 104 is able to fit withing the gap 134 (see FIG. 10) at least partially surrounding or blocking the pivoting of pawls 106a-c away from the deadband surface 132a-c. In particular, the biasing element 104 is able to be positioned within the pawl biasing element groove 162 and adjacent to or around the pawl spring pad 164 of each of the pawls 106a-c in order to resist the pivoting away from the deadband surface 132a-c and/or bias the pawls 106a-c in the retracted position. Indeed, by providing a shortened pad 164, the pawls 106a-c enable the biasing element 104 to have a smaller diameter and/or size and be closer to the deadband surface 132a-c. Additionally, the pad 164 provides a surface for the tang 192 to catch/grip and thereby prevent the biasing element 104 from rotating with respect to the pawls 106a-c.

Figure 18:
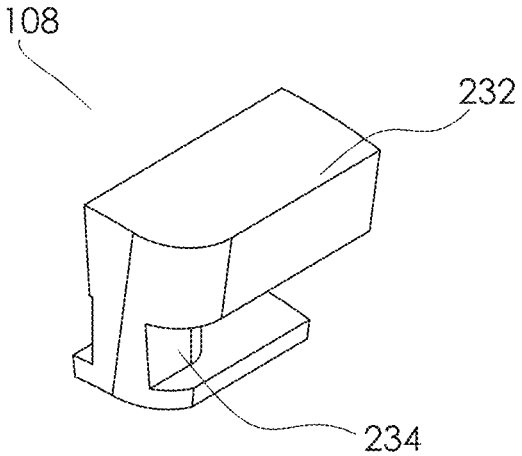
FIG. 18 illustrates a perspective view of a deadband adjustment key according to some embodiments.

FIG. 18 illustrates a perspective view of the deadband adjustment key 108 according to some embodiments. As shown in FIG. 18, the deadband adjustment key 108 comprises an adjustment block 232 and a coupling member 234. The coupling member 234 is able to have a trunk configured to fit within the deadband adjustment key slot 138 and a holding sheet that extends below an inside of the slot thereby keeping the trunk/key from falling out of the slot 138. The adjustment block 232 is able to extend from the slot 138 into the adjacent deadband recess next to the stop wall 136 of that recess (see FIGS. 19 and 22). As a result, when inserted into the slot 138, the adjustment block 232 reduces the size of the deadband recess by reducing the maximum distance that the pusher finger 144 of that recess (and all the other pusher fingers 144 because they are coupled together) is able to slide away from the pawl 106a-c of that recess. Indeed, although FIG. 18 illustrates an adjustment block 232 having a first width (e.g. width R shown in FIG. 19), it is understood that the adjustment block 232 is able to have larger or smaller widths and/or that the system is able to include multiple keys 108 having blocks 232 of different widths such that the user is able to select a key 108 having a desired width as a manner of adjusting the deadband distance of the system. Alternatively, the bearing assembly 102 is able to have a plurality of slots 138 along one of the deadband recesses such that deadband distance is able to be adjusted by inserting the key 108 in one of the slots 138 that is a desired distance from the stop wall 136 and/or pawl 106a-c of that recess.

Figure 19:
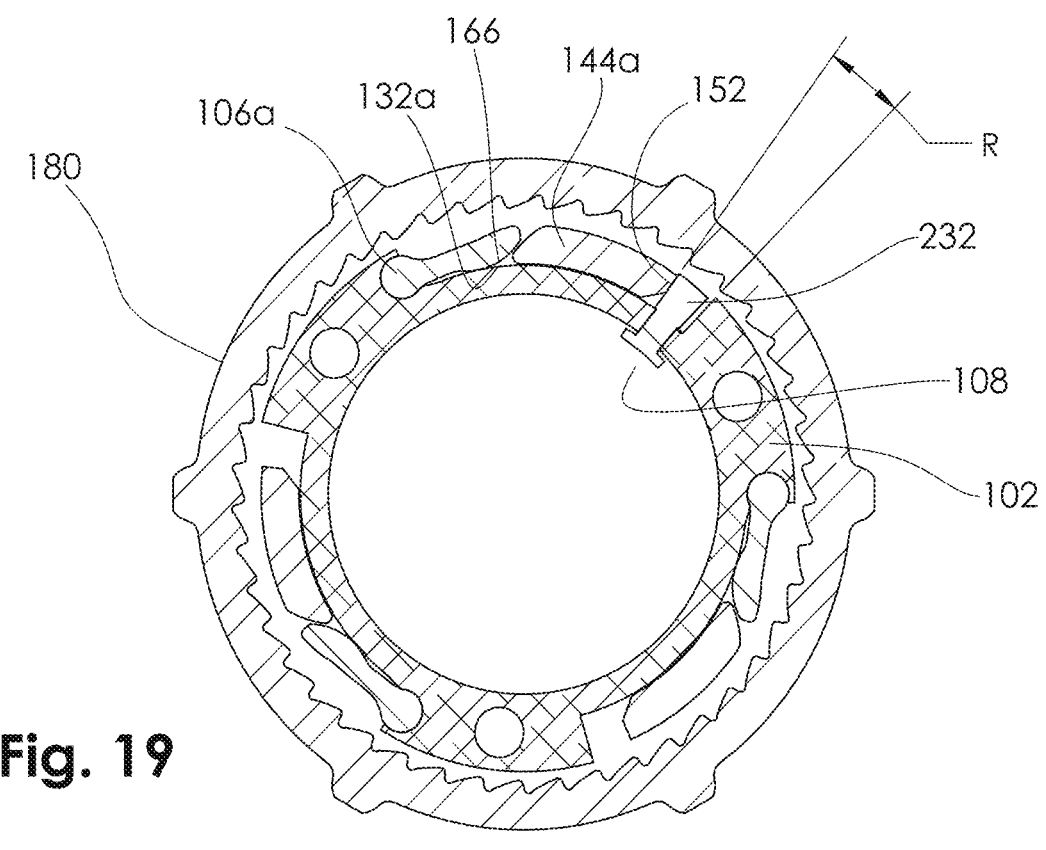
FIG. 19 illustrates a side cross-sectional view of a freehub bearing assembly including a coupled deadband adjustment key within a ratchet gear ring with the pawls retracted according to some embodiments.

FIG. 19 is a section view of hub assembly 1 with the freehub body assembly 100 inserted (e.g. concentrically nested) within the toothed ratchet gear 180 according to some embodiments. As shown in FIG. 19, the pawls 106a-c are in the retracted position (e.g. due to the force applied by the biasing element 104) with the block 232 of the inserted deadband adjustment key 108 reducing the distance between the pawls 106a-c and the fingers 144a-c. As a result, the hub assembly 1 is in a freewheeling configuration where the hub shell assembly 30 (e.g. the gear 180) is able to rotate clockwise with respect to the freehub body assembly 100 (e.g. the pawls 106a-c). Indeed, because the pawls 106a-c are able to retract such that they do not contact the gear 180, the hub assembly 1 is in a silent freewheeling configuration where the hub assembly 1 does not make a clicking noise found in traditional assemblies due to the contact of the pawls 106a-c with the gear 180. As shown in FIG. 19, in this configuration the pawl 106a is positioned so that the pawl pusher cam surface 166 is in contact with the deadband surface 132a and/or within the deadband cavity. Further, the pusher freewheel stop 152 is in contact with the block 232, therefore the deadband reduction angle R is developed between said pusher freewheel stop 152 and the stop surface 136.

Figure 20:
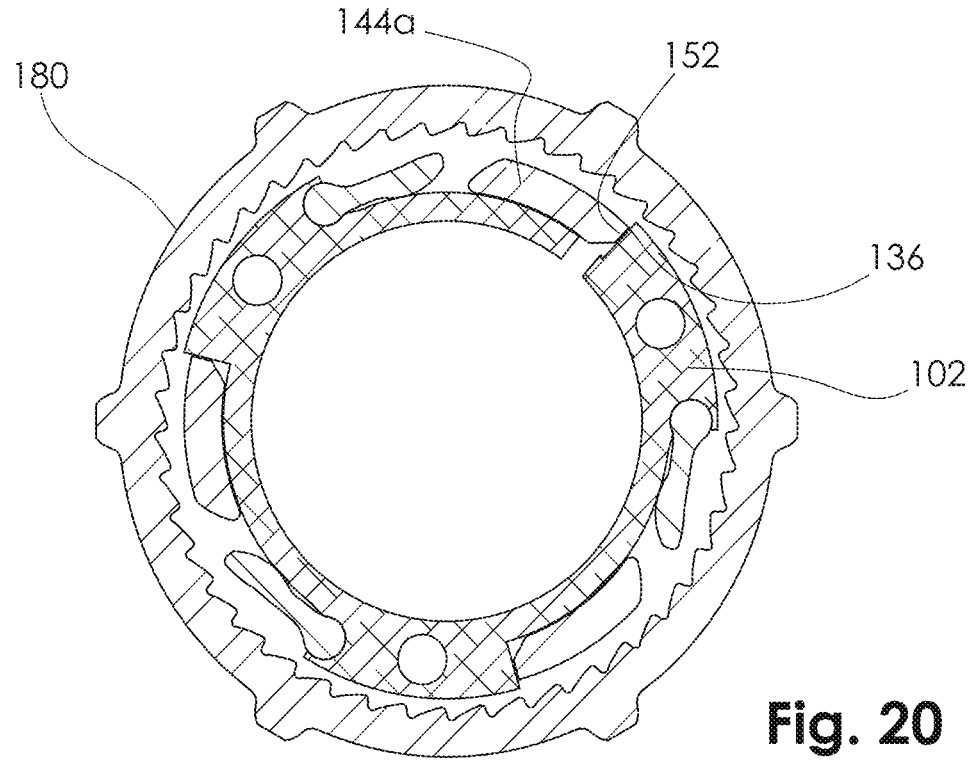
FIG. 20 illustrates a side cross-sectional view of a freehub bearing assembly without a deadband adjustment key within a ratchet gear ring with the pawls retracted according to some embodiments.

FIG. 20 is another section view of hub assembly 1 with the freehub body assembly 100 inserted (e.g. concentrically nested) within the toothed ratchet gear 180 according to some embodiments. However, unlike FIG. 19, in FIG. 20 the key 108 is not inserted in the slot 138 such that the deadband distance remains at its maximum. In particular, the pawls 106a-c are in the retracted position (e.g. due to the force applied by the biasing element 104) with the fingers 144a-c slid against the stop walls 136 away from the pawls 106a-c. As a result, the hub assembly 1 is in again in a silent freewheeling configuration where the hub shell assembly 30 (e.g. the gear 180) is able to rotate clockwise with respect to the freehub body assembly 100 (e.g. the pawls 106a-c). However, unlike the configuration in FIG. 19, the longer deadband distance in FIG. 20 will increase the time required for the fingers 144a-c to push the pawls 106a-c to the extended position and thus increase the time required for the pawls 106a-c to engage the gear 180 thereby reducing the likelihood of pedal kickback.

Figure 21:
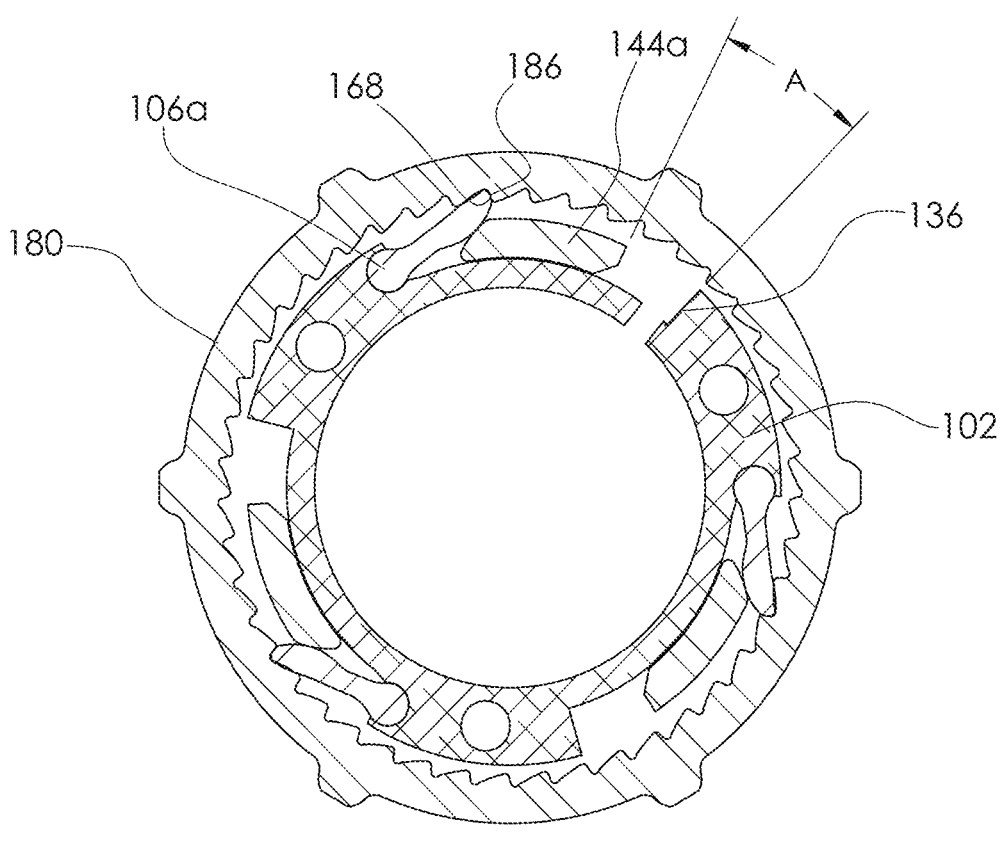
FIG. 21 illustrates a side cross-sectional view of a freehub bearing assembly without a deadband adjustment key within a ratchet gear ring with the pawls extended according to some embodiments.

FIG. 21 is another section view of hub assembly 1 with the freehub body assembly 100 inserted (e.g. concentrically nested) within the toothed ratchet gear 180 according to some embodiments. As shown in FIG. 21, the pawls 106a-c are in the extended position due to the extending force applied to the pawls 106a-c by the fingers 144a-c overcoming the biasing force applied by the biasing element 104. In particular, as the freehub body assembly 100 begins to rotate clockwise (e.g. due to pedaling), the one-way clutch 42 provides a drag or stopping force to the stem 142 of the pusher 140 such that the fingers 144a-c move counterclockwise with respect to the pawls 106a-c (and the remainder of the assembly 100). As a result, the fingers 144a-c slide along the deadband surface 132a-c toward the pawls 106a-c and eventually contact the pawls 106a-c, sliding under the tip 168 and the surface 166 thereby causing the pawls 106a-c to pivot away from the deadband surface 132a-c toward the teeth 185 of the ratchet gear 180 and into the extended position. When in the extended position, the pawls 106a-c contact/engage the teeth 185 of the ratchet gear 180 so that pedaling torque applied to the freehub body assembly 100 is transferred to the hub shell assembly 30 via the pawls 106a-c pressing against the teeth 185 of the ratchet gear 180 (which presses against the hub shell assembly 30). In this extended position, the ratchet pawls 106a-c are positioned so that pawl driving surface 168 is pressing against ratchet tooth receiving face 186. Engagement deadband angle/length A is shown as the free movement of the fingers 144a-c of the pawl pusher 140 before the ratchet pawl 106a is in complete contact with ratchet gear 180. Indeed, because the key 108 is not inserted in the key slot 138, the pawl pushers 140 must move the maximum deadband distance in order to cause the pawls 106a-c to fully extend and/or engage the ratchet gear 180.

As described above, when transitioning from the extended position to the retracted position, as they move counterclockwise with respect to the gear 180, the pawls 106a-c slide against the sliding face 188 of the teeth 185 without engaging the teeth 185 thereby enabling the gear 180 to rotate clockwise independent of the freehub body assembly 100. In contrast, when transitioning from the retracted position to the extended position, as they move clockwise with respect to the gear 180, once the pawls 106a-c pivot such that they are able to contact the gear 180, the pawls 106a-c catch/engage with one of the receiving faces 186 of the teeth 186 thereby causing the gear 180 to rotate clockwise due to the force of the clockwise rotation of the freehub body assembly 100.

Figure 22:
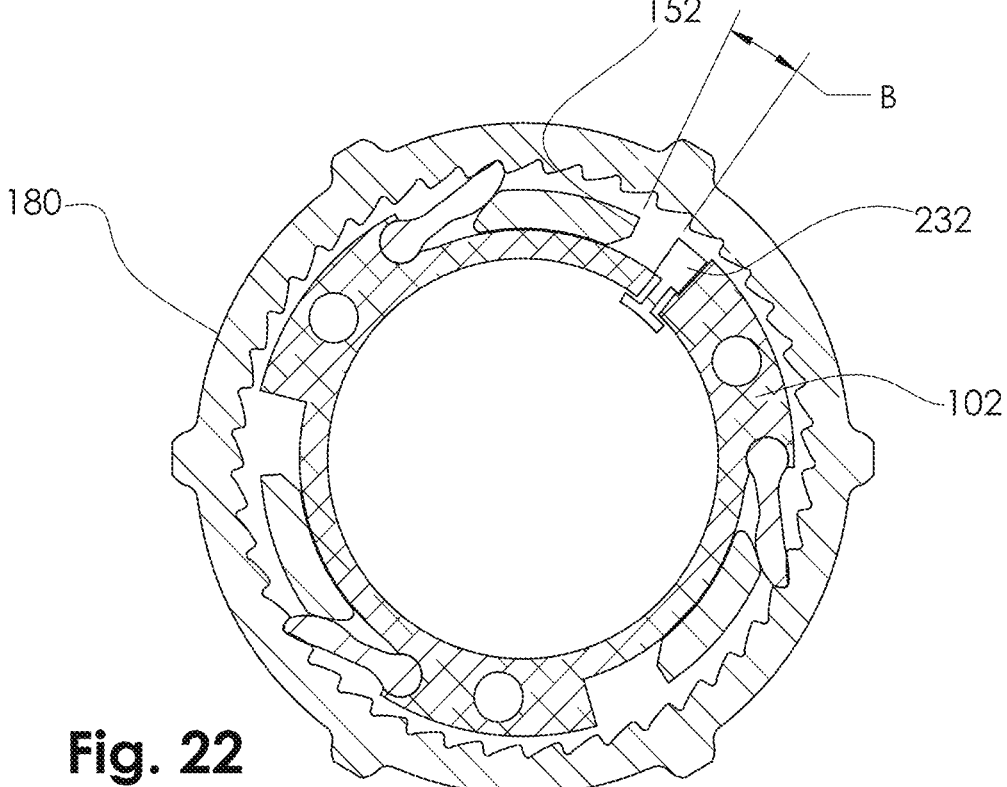
FIG. 22 illustrates a side cross-sectional view of a freehub bearing assembly including a coupled deadband adjustment key within a ratchet gear ring with the pawls extended according to some embodiments.

FIG. 22 is another section view of hub assembly 1 with the freehub body assembly 100 inserted (e.g. concentrically nested) within the toothed ratchet gear 180 according to some embodiments. In particular, FIG. 22 is substantially similar to FIG. 21 except that the deadband adjustment key 108 is inserted into the key slot 138 thereby reducing the deadband distance. As a result, as illustrated by the reduced length B, instead of moving the longer length/angle A as shown in FIG. 21, the pawl pushers 140 only need to move the less than maximum deadband distance/angle B in order to cause the pawls 106a-c to fully extend and/or engage the ratchet gear 180. Thus, the hub assembly 1 provides the advantage of enabling the deadband distance to be adjusted and/or configured for silent freewheeling. In particular, the combination of the biasing element 104 causing the pawls 106a-c to automatically retract into the retracted position and the one-way ratchet 42 and/or pusher 140 causing the pawls 106a-c to extend when the assembly 100 is rotated in a drive direction (e.g. clockwise) enable the assembly to be customized to reduce pedal kickback and/or to a responsiveness level desired by the rider.

In operation, as described above the hub 1 is able to operate in two modes. In the first mode, "freewheeling," the hub 1 freewheels when the bicycle 200 is rolling forward and the pedal crank 208 remains stationary. The cranks 208, chain 212, cassette 214 and freehub body assembly 100 remain motionless relative to the bicycle frame 204, 206, while the rear wheel rotates forward. In the second mode, the hub 1 drives the bicycle 200 forward when the pedal cranks 208 are pedaled forward by the bicycle rider. The chainring 209 rotates and applies tension to the bicycle chain 212, rotating the bicycle cassette 214 and freehub body assembly 100, and the freehub body assembly 100 applies torque to the hub shell assembly 30, rotating the wheel and driving the bicycle 200 forward. In this manner the rider propels the bicycle 200 forward by rotating the pedals.

In further detail, as described above, the hub assembly 1 freewheels when the ratchet pawls 106a-c are in the retracted position towards the bearing assembly 102, as depicted in FIG. 19. Under freewheeling conditions, the hub shell assembly 30 rotates clockwise relative to the hub center axis 6, while the freehub body assembly 100 remains stationary. The one-way clutch 42 is therefore also rotating clockwise relative to the pusher stem 142. The one-way clutch 42 is able to be specified and installed such that it allows the pusher stem 142 to rotate freely in the drive (e.g. forward pedaling or clockwise direction), but locks and resists or stops rotation in the opposite direction (e.g. counter-clockwise direction). Thus, as the hub shell assembly 30 freewheels, the residual drag in the clutch 42, which owing to the physics of any free-running clutch cannot be zero, is able to continuously rotate the pawl pusher 140 clockwise relative to the pawl pusher center axis 147, which is nominally identical to the hub center axis 6.

During freewheeling, the biasing element 104 contacts the pawl pads 164 and presses the pawls 106a-c inward towards the center of the hub 100, allowing the ratchet gear 180 to rotate freely around the ratchet pawls 106a-c with no contact, and consequently no sound. In particular, as described above, the biasing element 104 is able to be sized such that it provides a constant inward force towards the hub center axis 6 on the pawl spring pads 164 throughout the entire free range of the pawls 106a-c within the assembly 1. This force may be controlled by sizing the resting diameter of the shape of the elongated body of the biasing element 104, by choosing the strength/flexibility of the material of the biasing element 104 and/or the diameter of the body of the biasing element 104.

Depending on how the hub deadband distance has been configured, the pusher stop wall 152 is able to be pressed against either the freehub stop surface 136 or the deadband adjustment key block 232 (if the deadband adjustment key 108 is installed in the hub 100). If the deadband adjustment key 108 is not installed, the parts of the hub will be resting in the configuration shown in FIG. 20. If the deadband adjustment key 108 is installed, the parts will be resting in the configuration shown in FIG. 19.

The deadband of the hub 1 is developed as the rider transitions from coasting to moving the pedal cranks 208 and actively pedaling the bicycle 200 forward. As the pedal cranks 208 begin moving, the freehub bearing assembly 102 begins rotating clockwise relative to the hub center axis 6, until the speed of the freehub bearing assembly 102 matches the rolling speed of the hub shell assembly 30. Once these rotational velocities match, the pusher stem 142 is stationary relative to the one-way clutch 42, and therefor as the one-way clutch 42 begins to develop a torque against the pusher stem 142, and thus the pawl pusher 140 begins to rotates in the opposing direction (e.g. counter-clockwise) relative to the freehub bearing assembly 102. As this rotation occurs, the pusher cam surface 166 of the pawls 106*a-c* moves towards and comes into contact with the pawl surface 148 of the pusher fingers 144*a-c*. Once this happens the ratchet pawls 106*a-c* begin to pivot about the pawl cylinder 160, such that the pawl tip radius 170 moves outward towards the ratchet gear 180. Since the ratchet gear 180 may still be rotating relative to the freehub bearing assembly 102, the pawl tip radius 170 contacts the ratchet gear 180 in a random location based on when the pedal stroke is started, the speed of the wheel, and other factors. Once this contact occurs, the pawl tip radius 170 slides over the ratchet tooth sliding face 188 until the pawl driving surface 168 contacts the ratchet tooth receiving face 186. Once this contact occurs, torque is transferred from the freehub bearing assembly 102 to the hub shell assembly 30 via the ratchet pawls 106*a-c* in compression against the teeth 185.

Once underway, the rider may cease pedaling to resume freewheeling. When torque is no longer applied to the freehub bearing assembly 102, the ratchet gear 180 resumes (e.g. clockwise) rotation relative to the freehub bearing assembly 102, and the ratchet pawl 106 is forced away from the ratchet ring 180 as the pawl tip radius 170 slides back down the ratchet tooth sliding face 188 (and/or due to the inward biasing force applied by the biasing element 104). Simultaneously, the pawl pusher 140 is free to rotate (e.g. clockwise) with the hub shell assembly 30, and is able to be helped along by the sliding contact between the pawl surface 148 of the pusher 140 and the pusher cam surface 166 of the pawls 106*a-c*. Once the ratchet pawls 106*a-c* have moved to the retracted position, the pawl pusher 140 continues rotating clockwise relative to the freehub bearing assembly 102 owing to the parasitic free-running drag between the pusher stem 142 and the one-way clutch 42.

Figure 23:
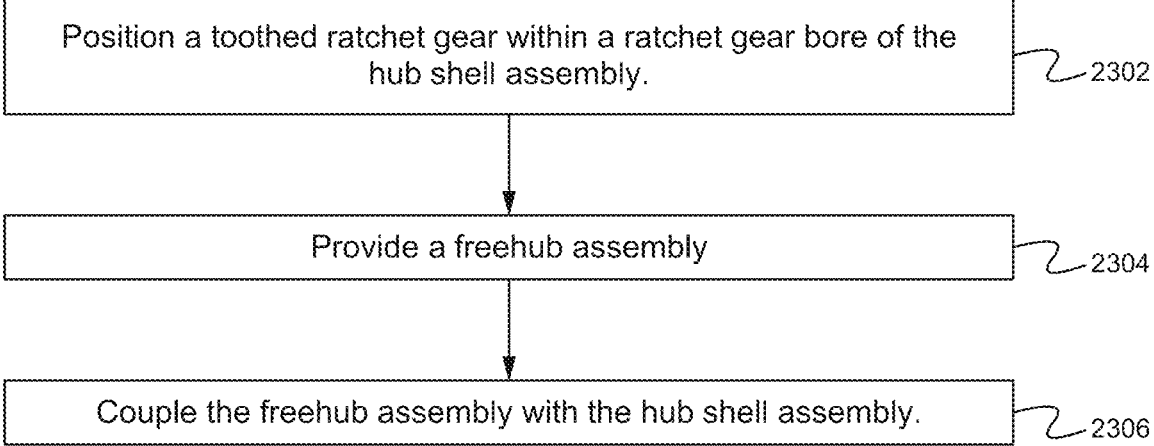
FIG. 23 illustrates a method of providing a hub assembly according to some embodiments.

FIG. 23 illustrates a method of providing a hub assembly 1 according to some embodiments. As shown in FIG. 23, a toothed ratchet gear 180 is positioned within a ratchet gear bore 38 of the hub shell assembly 30 at the step 2302. The ratchet gear 180 is able to be aligned within the bore 38 such that splines 184 slide into corresponding hub shell spine channels 40 thereby preventing rotation of the gear 180 within the bore 38 with respect to the hub shell assembly 30. A freehub assembly 100 is provided at the step 2304. The freehub assembly 100 is coupled with the hub shell assembly 30 at the step 2306. In some embodiments, the coupling is able to comprise positioning an inner side of the pawl support member 102 is positioned the toothed ratchet gear 180 such that when the freehub assembly 100 is rotated in a first direction with respect to the hub shell assembly 30, the plurality of pawls 106 are able to pivot away from the pawl support member 102 (e.g. away from the deadband surface and/or the deadband recesses 132) until the plurality of pawls 106 engage teeth 185 of the toothed ratchet gear 180 causing the hub shell assembly 30 to rotate with the freehub assembly 100 in the first direction. In some embodiments, the method further comprises selectively inserting or removing a deadband adjustment key 108 within a deadband adjustment key slot 138 and/or selecting a deadband adjustment key 108 having a block 232 of a desired size. In particular, the method is able to comprise sliding trunk 234 of the deadband adjustment key 108 into the key slot 138 such that the block 232 of the deadband adjustment key 108 extends into the one of the deadband recesses 132 adjacent to one of the stop walls 136. Thus, when the freehub assembly 100 rotates with respect to the hub shell assembly 30 in a second direction, each of the pushing fingers 144 slide along the deadband surface until one of the pushing fingers 144 abuts the block 232 of the deadband adjustment key 108 (thereby reducing the size of the deadband within the hub assembly 1).

As a result, the method provides the advantage of providing a hub assembly having pawls 106 biased away from the ratchet gear 180 thereby ensuring a non-zero deadband length (regardless of the relative position of the pawls 106 and the teeth 185) and/or a silent hub assembly. Further, the method provides the advantage of enabling adjustment of a deadband length/amount of the hub assembly via a deadband adjustment key (to reduce or adjust kickback and/or sound produced by the hub) as desired by the user.

The system, method and device described herein has numerous advantages. In particular, the system, method and device provide the advantage of providing a hub assembly having pawls biased away from the ratchet gear thereby ensuring a non-zero deadband length (regardless of the relative position of the pawls and the teeth). Further, the system, method and device provides the advantage of enabling adjustment of a deadband length/amount of the hub assembly via a deadband adjustment key (to reduce or adjust kickback and/or sound produced by the hub) as desired by the user. Additionally, the system, method and device provide the advantage of enabling the deadband distance to be adjusted and/or configured for silent freewheeling.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention. For example, although the hub assembly 1 is described herein with respect to a bicycle wheel, it is understood that the assembly 1, hub shell assembly 30 and/or the freehub assembly 100 are able to operate in the same manner and be incorporated into other vehicles or devices to provide a ratchet mechanism/function. Further, although the assembly 1 is described herein with respect to a rear wheel, it is understood that the assembly 1, hub shell assembly 30 and/or the freehub assembly 100 are able to operate in the same manner and be incorporated into other wheels and/or non-wheels using axle/rotation based mechanisms the require a ratcheting function.

What is claimed is:

1. A bicycle hub system, the system comprising:
   a bicycle wheel including a hub shell assembly, the hub shell assembly having a central aperture for receiving an axle, a ratchet gear bore, a one-way clutch and a toothed ratchet gear positioned within the ratchet gear bore; and
   a freehub assembly including an outer hub sprocket attachment feature, a pawl support member having a plurality of pawl pivot channels, a plurality of pawls pivotably coupled within the pivot channels, and a biasing member that applies a biasing force to the plurality of pawls that resists the pivoting of the plurality of pawls away from a deadband surface of the pawl support member;
wherein the pawl support member is positioned within the toothed ratchet gear such that when the freehub assembly is rotated in a first direction with respect to the hub shell assembly, the plurality of pawls are able to pivot away from the pawl support member until the plurality of pawls engage teeth of the toothed ratchet gear causing the hub shell assembly to rotate with the freehub assembly in the first direction.

2. The system of claim 1, wherein the biasing member is a spring that impedes the pivoting of the plurality of pawls away from the pawl support member.

3. The system of claim 2, wherein each the plurality of pawls include a groove for receiving the biasing member.

4. The system of claim 1, wherein when fully rotated toward the deadband surface, the plurality of pawls are unable to contact the teeth of the toothed ratchet gear.

5. The system of claim 1, wherein the one-way clutch is operatively coupled with a pawl pusher such that the one-way clutch prevents rotation of pushing fingers of the pawl pusher in the first direction with respect to the hub shell assembly and thereby causes the pushing fingers to slide along the deadband surface when the freehub assembly is rotated in the first direction with respect to the hub shell assembly.

6. The system of claim 1, wherein the deadband surface extends between each of the pivot channels and a corresponding stop wall of a plurality of stop walls of the pawl support member thereby forming a plurality of deadband cavities adjacent to the deadband surface.

7. The system of claim 6, wherein a different pair of one of the plurality of pawls and one of a plurality of pushing fingers is positioned at least partially within each of the deadband cavities when the plurality of pawls are fully rotated against the deadband surface.

8. The system of claim 7, wherein when the freehub assembly rotates with respect to the hub shell assembly in a second direction opposite the first direction, each of the pushing fingers slides along the deadband surface until the pushing finger abuts one of the stop walls.

9. The system of claim 6, wherein a key slot is positioned adjacent to one of the deadband cavities.

10. The system of claim 9, wherein when coupled within the key slot, a block of a deadband adjustment key extends into the one of the deadband cavities adjacent to the stop wall such that when the freehub assembly rotates with respect to the hub shell assembly in the second direction, each of a plurality of pushing fingers slides along the deadband surface until one of the pushing fingers abuts the block of the deadband adjustment key.

11. The system of claim 1, wherein the outer hub sprocket attachment feature is an outer cassette spline for coupling with one or more sprockets.

12. A bicycle hub system, the system comprising:
a bicycle wheel including a hub shell assembly, the hub shell assembly having a central aperture for receiving an axle, a ratchet gear bore and a toothed ratchet gear positioned within the ratchet gear bore;
a freehub assembly including an outer hub sprocket attachment feature, a pawl support member having a plurality of pawl pivot channels, a plurality of pawls pivotably coupled within the pivot channels, and a biasing member that applies a biasing force to the plurality of pawls that resists the pivoting of the plurality of pawls away from a deadband surface of the pawl support member; and
a pawl pusher having a plurality of pushing fingers positioned along the deadband surface of the pawl support member;
wherein the pawl support member is positioned within the toothed ratchet gear such that when the freehub assembly is rotated in a first direction with respect to the hub shell assembly, the plurality of pawls are able to pivot away from the pawl support member until the plurality of pawls engage teeth of the toothed ratchet gear causing the hub shell assembly to rotate with the freehub assembly in the first direction.

13. The system of claim 12, wherein when the freehub assembly is rotated in the first direction with respect to the hub shell assembly, the pushing fingers slide along the deadband surface of the pawl support member and push against tips of the plurality of pawls and thereby forcing the plurality of pawls to pivot away from the deadband surface of the pawl support member.

14. A bicycle hub assembly, the bicycle hub assembly comprising:
a one-way clutch;
a toothed ratchet gear having a plurality of teeth; and
a freehub assembly including a pawl support member having a plurality of pawl pivot channels, a plurality of pawls pivotably coupled within the pivot channels, and a biasing member that applies a biasing force to the plurality of pawls that resists the pivoting of the plurality of pawls away from a deadband surface of the pawl support member;
wherein the pawl support member is positioned within the toothed ratchet gear such that when the freehub assembly is rotated in a first direction with respect to the toothed ratchet gear, the plurality of pawls are able to pivot away from the pawl support member until the plurality of pawls engage the teeth of the toothed ratchet gear causing the toothed ratchet gear to rotate with the freehub assembly in the first direction.

15. The assembly of claim 14, wherein the biasing member is a spring that impedes the pivoting of the plurality of pawls away from the pawl support member.

16. The assembly of claim 15, wherein each the plurality of pawls include a groove for receiving the biasing member.

17. The assembly of claim 14, wherein when fully rotated toward the deadband surface, the plurality of pawls are unable to contact the teeth of the toothed ratchet gear.

18. The assembly of claim 14, wherein the one-way clutch is operatively coupled with a pawl pusher such that the one-way clutch prevents rotation of pushing fingers of the pawl pusher in the first direction with respect to the toothed ratchet gear and thereby causes the pushing fingers to slide along the deadband surface when the freehub assembly is rotated in the first direction with respect to the toothed ratchet gear.

19. The assembly of claim 14, wherein the deadband surface extends between each of the pivot channels and a corresponding stop wall of a plurality of stop walls of the pawl support member thereby forming a plurality of deadband cavities adjacent to the deadband surface.

20. The assembly of claim 19, wherein a different pair of one of the plurality of pawls and one of a plurality of pushing fingers is positioned at least partially within each of the deadband cavities when the plurality of pawls are fully rotated against the deadband surface.

21. The assembly of claim 20, wherein when the freehub assembly rotates with respect to the toothed ratchet gear in a second direction opposite the first direction, each of the pushing fingers slides along the deadband surface until the pushing finger abuts one of the stop walls.

22. The assembly of claim 19, wherein a key slot is positioned adjacent to one of the deadband cavities.

23. The assembly of claim 22, wherein when coupled within the key slot, a block of a deadband adjustment key extends into the one of the deadband cavities adjacent to the stop wall such that when the freehub assembly rotates with respect to the toothed ratchet gear in the second direction, each of a plurality of pushing fingers slides along the deadband surface until one of the pushing fingers abuts the block of the deadband adjustment key.

24. The assembly of claim 14, wherein the freehub assembly includes an outer hub sprocket attachment feature for coupling with one or more sprockets.

25. A bicycle hub assembly, the bicycle hub assembly comprising:

a toothed ratchet gear having a plurality of teeth;

a freehub assembly including a pawl support member having a plurality of pawl pivot channels, a plurality of pawls pivotably coupled within the pivot channels, and a biasing member that applies a biasing force to the plurality of pawls that resists the pivoting of the plurality of pawls away from a deadband surface of the pawl support member; and a pawl pusher having a plurality of pushing fingers positioned along the deadband surface of the pawl support member;

wherein the pawl support member is positioned within the toothed ratchet gear such that when the freehub assembly is rotated in a first direction with respect to the toothed ratchet gear, the plurality of pawls are able to pivot away from the pawl support member until the plurality of pawls engage the teeth of the toothed ratchet gear causing the toothed ratchet gear to rotate with the freehub assembly in the first direction.

26. The assembly of claim 25, wherein when the freehub assembly is rotated in the first direction with respect to the toothed ratchet gear, the pushing fingers slide along the deadband surface of the pawl support member and push against tips of the plurality of pawls and thereby forcing the plurality of pawls to pivot away from the deadband surface of the pawl support member.

27. A method of providing a bicycle hub system, the method comprising:

providing a hub shell assembly including a toothed ratchet gear positioned within a ratchet gear bore and a one-way clutch, the hub shell assembly for coupling with a bicycle wheel rim via a plurality of spokes;

providing a freehub assembly including an outer hub sprocket attachment feature, a pawl support member having a plurality of pawl pivot channels, a plurality of pawls pivotably coupled within the pivot channels, and a biasing member that applies a biasing force to the plurality of pawls that resists the pivoting of the plurality of pawls away from a deadband surface of the pawl support member; and coupling the freehub assembly with the hub shell assembly such that the pawl support member is positioned within the toothed ratchet gear and when the freehub assembly is rotated in a first direction with respect to the hub shell assembly, the plurality of pawls are able to pivot away from the pawl support member until the plurality of pawls engage teeth of the toothed ratchet gear causing the hub shell assembly to rotate with the freehub assembly in the first direction.

28. The method of claim 27, wherein the biasing member is a spring that impedes the pivoting of the plurality of pawls away from the pawl support member.

29. The method of claim 28, wherein each the plurality of pawls include a groove for receiving the biasing member.

30. The method of claim 27, wherein when fully rotated toward the deadband surface, the plurality of pawls are unable to contact the teeth of the toothed ratchet gear.

31. The method of claim 27, wherein the one-way clutch that is operatively coupled with a pawl pusher such that the one-way clutch prevents rotation of pushing fingers of the pawl pusher in the first direction with respect to the hub shell assembly and thereby causes the pushing fingers to slide along the deadband surface when the freehub assembly is rotated in the first direction with respect to the hub shell assembly.

32. The method of claim 27, wherein the deadband surface extends between each of the pivot channels and a corresponding stop wall of a plurality of stop walls of the pawl support member thereby forming a plurality of deadband cavities adjacent to the deadband surface.

33. The method of claim 32, wherein a different pair of one of the plurality of pawls and one of a plurality of pushing fingers is positioned at least partially within each of the deadband cavities when the plurality of pawls are fully rotated against the deadband surface.

34. The method of claim 33, wherein when the freehub assembly rotates with respect to the hub shell assembly in a second direction opposite the first direction, each of the pushing fingers slides along the deadband surface until the pushing finger abuts one of the stop walls.

35. The method of claim 32, wherein a key slot is positioned adjacent to one of the deadband cavities.

36. The method of claim 35, further comprising sliding a deadband adjustment key into the key slot such that a block of the deadband adjustment key extends into the one of the deadband cavities adjacent to the stop wall and when the freehub assembly rotates with respect to the hub shell assembly in the second direction, each of a plurality of pushing fingers slides along the deadband surface until one of the pushing fingers abuts the block of the deadband adjustment key.

37. The method of claim 27, wherein the outer hub sprocket attachment feature is an outer cassette spline for coupling with one or more sprockets.

38. A method of providing a bicycle hub system, the method comprising:

providing a hub shell assembly including a toothed ratchet gear positioned within a ratchet gear bore, the hub shell assembly for coupling with a bicycle wheel rim via a plurality of spokes; and providing a freehub assembly including an outer hub sprocket attachment feature, a pawl support member having a plurality of pawl pivot channels, a plurality of pawls pivotably coupled within the pivot channels, a pawl pusher having a plurality of pushing fingers positioned along the deadband surface of the pawl support member and a biasing member that applies a biasing force to the plurality of pawls that resists the pivoting of the plurality of pawls away from a deadband surface of the pawl support member; and coupling the freehub assembly with the hub shell assembly such that the pawl support member is positioned within the toothed ratchet gear and when the freehub assembly is rotated in a first direction with respect to the hub shell assembly, the plurality of pawls are able to pivot away from the pawl support member until the plurality of pawls engage teeth of the toothed ratchet gear causing the hub shell assembly to rotate with the freehub assembly in the first direction.

39. The method of claim 38, wherein when the freehub assembly is rotated in the first direction with respect to the hub shell assembly, the pushing fingers slide along the deadband surface of the pawl support member and push against tips of the plurality of pawls and thereby forcing the plurality of pawls to pivot away from the deadband surface of the pawl support member.

\* \* \* \* \*